(12) United States Patent
Liguori et al.

(10) Patent No.: US 11,620,081 B1
(45) Date of Patent: Apr. 4, 2023

(54) VIRTUALIZED BLOCK STORAGE SERVERS IN CLOUD PROVIDER SUBSTRATE EXTENSION

(71) Applicant: Amazon Technologies, Inc., Seattle, WA (US)

(72) Inventors: Anthony Nicholas Liguori, Bainbridge Island, WA (US); Marc Stephen Olson, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/199,029

(22) Filed: Mar. 11, 2021

Related U.S. Application Data

(63) Continuation of application No. 16/457,850, filed on Jun. 28, 2019, now Pat. No. 10,949,124.

(51) Int. Cl.
*G06F 3/06* (2006.01)
*G06F 9/455* (2018.01)
(Continued)

(52) U.S. Cl.
CPC .......... *G06F 3/0659* (2013.01); *G06F 3/0604* (2013.01); *G06F 3/064* (2013.01); *G06F 3/067* (2013.01); *G06F 3/0644* (2013.01); *G06F 3/0664* (2013.01); *G06F 3/0665* (2013.01); *G06F 9/45558* (2013.01); *H04L 9/0819* (2013.01); *G06F 9/4416* (2013.01);
(Continued)

(58) Field of Classification Search
None
See application file for complete search history.

(56) References Cited

U.S. PATENT DOCUMENTS 8,789,208 B1  7/2014  Sundaram et al.
9,635,132 B1  4/2017  Lin et al.
(Continued)

FOREIGN PATENT DOCUMENTS

CN   103797770 A   5/2014
CN   105283838 A   1/2016
(Continued)

OTHER PUBLICATIONS

Examination Report, IN App. No. 202147057797, dated Apr. 28, 2022, 6 pages.
(Continued)

*Primary Examiner* — Nathan Sadler
(74) *Attorney, Agent, or Firm* — Nicholson De Vos Webster & Elliott, LLP

(57) ABSTRACT

A first block storage server virtual machine to host a first volume using one or more storage devices of a computer system is executed by the computer system. A second virtual machine having access to a virtual block storage device is executed by the computer system. A block storage client is executed by the computer system. A first block storage operation is received by the block storage client from the second virtual machine, the first block storage operation to perform on the virtual block storage device. A message is sent by the block storage client to the first block storage server virtual machine to cause the first block storage server virtual machine to perform the block storage operation with the first volume.

20 Claims, 17 Drawing Sheets

(51) Int. Cl.
*H04L 9/08* (2006.01)
*G06F 9/4401* (2018.01)

(52) U.S. Cl.
CPC .............. *G06F 2009/45579* (2013.01); *G06F 2009/45583* (2013.01)

(56) References Cited

U.S. PATENT DOCUMENTS

| | | | |
|---|---|---|---|
| 9,678,769 | B1* | 6/2017 | Scott .................... G06F 8/70 |
| 9,690,504 | B1 | 6/2017 | Natanzon et al. |
| 9,692,729 | B1 | 6/2017 | Chen et al. |
| 9,733,849 | B2 | 8/2017 | O'Hare et al. |
| 9,954,763 | B1 | 4/2018 | Ye et al. |
| 10,185,507 | B1 | 1/2019 | Olson et al. |
| 10,268,593 | B1 | 4/2019 | Olson et al. |
| 10,298,670 | B2 | 5/2019 | Ben-Shaul et al. |
| 10,333,789 | B1 | 6/2019 | Dippenaar et al. |
| 10,949,124 | B2* | 3/2021 | Liguori ............. G06F 3/0671 |
| 10,949,125 | B2* | 3/2021 | Liguori ............. G06F 9/45558 |
| 10,949,131 | B2* | 3/2021 | Olson ................ G06F 3/0659 |
| 2008/0313474 | A1 | 12/2008 | Kahn et al. |
| 2013/0007219 | A1 | 1/2013 | Sorenson, III et al. |
| 2013/0111127 | A1* | 5/2013 | Araki ................. G06F 3/0605 |
| | | | 711/147 |
| 2014/0237594 | A1 | 8/2014 | Thakadu et al. |
| 2014/0365549 | A1 | 12/2014 | Jenkins |
| 2014/0366155 | A1 | 12/2014 | Chang et al. |
| 2015/0261443 | A1 | 9/2015 | Wei et al. |
| 2016/0014200 | A1* | 1/2016 | Murrish ............. G06F 3/0617 |
| | | | 709/219 |
| 2016/0048408 | A1 | 2/2016 | Madhu et al. |
| 2017/0054680 | A1 | 2/2017 | Ito |
| 2017/0180211 | A1 | 6/2017 | Johnson |
| 2017/0220370 | A1* | 8/2017 | Klompje ............. G06F 9/45558 |
| 2018/0062923 | A1* | 3/2018 | Katrekar ............. H04L 63/062 |
| 2018/0173561 | A1 | 6/2018 | Moroski et al. |
| 2019/0278700 | A1 | 9/2019 | Ranjan et al. |
| 2019/0286373 | A1 | 9/2019 | Karumbunathan et al. |
| 2019/0317781 | A1 | 10/2019 | Suryanarayanan et al. |
| 2019/0361626 | A1 | 11/2019 | East |
| 2020/0081648 | A1 | 3/2020 | Bernat et al. |
| 2020/0167093 | A1 | 5/2020 | Lan et al. |
| 2020/0183720 | A1 | 6/2020 | Dai et al. |

FOREIGN PATENT DOCUMENTS

| | | |
|---|---|---|
| CN | 105549904 A | 5/2016 |
| CN | 105892943 A | 8/2016 |
| CN | 106462408 A | 2/2017 |
| CN | 106656631 A | 5/2017 |
| EP | 2784985 A1 | 10/2014 |
| JP | 2014-529111 A | 10/2014 |
| JP | 2016-524760 A | 8/2016 |
| WO | 2015179508 A1 | 11/2015 |

OTHER PUBLICATIONS

International Preliminary Report on Patentability, PCT App. No. PCT/US2020/037195, dated Jan. 6, 2022, 9 pages.
Microsoft. "Microsoft Cloud Networking for Enterprise Architects." Dec. 2018. http://download.microsoft.eom/download/a/9/3/a93dbac9-e6de-479c-a62b-a460633f84db/msft_cloud_architecture_networking.pdf.
U.S. Appl. No. 15/385,767, filed Dec. 20, 2016.
U.S. Appl. No. 15/385,814, filed Dec. 20, 2016.
U.S. Appl. No. 15/385,815, filed Dec. 20, 2016.
U.S. Appl. No. 16/196,723, filed Nov. 20, 2018.
U.S. Appl. No. 16/196,736, filed Nov. 20, 2018.
Microsoft "Microsoft Cloud Networking for Enterprise Architects", Microsoft Corporation, Dec. 2016, 12 pages.
Office Action, EP App. No. 20751720.2, dated May 11, 2022, 10 pages.
International Search Report and Written Opinion for International Application No. PCT/US2020/037195, dated Nov. 9, 2020, 13 pages.
Notice of Allowance for U.S. Appl. No. 16/457,856, dated Oct. 28, 2020, 23 pages.
Notice of Allowance for U.S. Appl. No. 16/457,853, dated Oct. 28, 2020, 24 pages.
Notice of Allowance for U.S. Appl. No. 16/457,850, dated Oct. 28, 2020, 24 pages.
Office Action, CN App. No. 202080047292.8, dated Oct. 18, 2022, 21 pages (9 pages of English Translation and 12 pages of Original Document).
Office Action, CN Application No. 202080047292.8, dated Jul. 18, 2022, 34 pages (19 pages English translation, 15 pages Original document).
Summons to Attend Oral Proceedings, EP Application No. 20751720.2, Sep. 16, 2022, 12 pages.
Notice of Reasons for Refusal, JP App. No 2021-576312, dated Feb. 7, 2023, 7 pages (4 pages of English Translation and 3 pages of Original Document).

* cited by examiner

US 11,620,081 B1

VIRTUALIZED BLOCK STORAGE SERVERS IN CLOUD PROVIDER SUBSTRATE EXTENSION

CROSS-REFERENCE TO RELATED APPLICATIONS

This application is a continuation of U.S. application Ser. No. 16/457,850, filed Jun. 28, 2019, which is hereby incorporated by reference in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

A wide variety of virtual machine types, optimized for different types of applications such as compute-intensive applications, memory-intensive applications, and the like may be set up at the data centers of some cloud computing provider networks in response to client requests. In addition, higher-level services that rely upon the virtual computing services of such provider networks, such as some database services whose database instances are instantiated using virtual machines of the virtual computing services, may also be made available to provider network clients. For some types of applications, however, such as applications that process very large amounts of data that has to be stored at customer premises outside the provider network, services that are limited to providing virtualized resources using hardware located at data centers of the provider network may not be optimal, e.g., for latency-related and/or other reasons.

BRIEF DESCRIPTION OF DRAWINGS

Various embodiments in accordance with the present disclosure will be described with reference to the following drawings.

DETAILED DESCRIPTION

Figure 1:
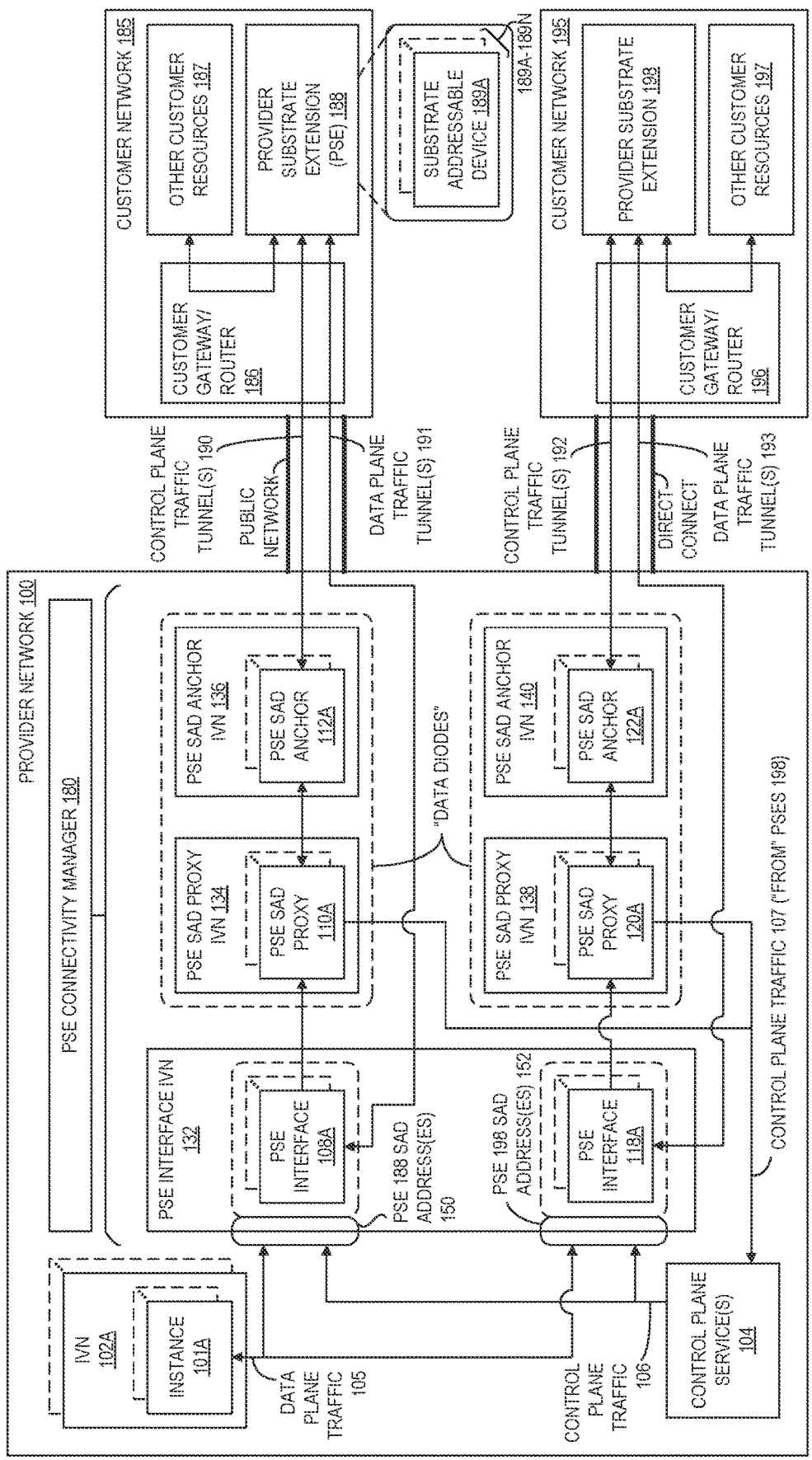
FIG. 1 is a block diagram illustrating an example provider network extended by a provider substrate extension located within a network external to the provider network according to at least some embodiments.

The present disclosure relates to methods, apparatus, systems, and non-transitory computer-readable storage media for configuring a provider substrate extension for communication with a network external to a provider network, and for providing virtualized resources on the substrate extension that are the same as or similar to resources that are available in the provider network. A provider network operator (or provider) provides its users (or customers) with the ability to utilize one or more of a variety of types of computing-related resources such as compute resources (e.g., executing virtual machines (VMs) and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services.

Provider network operators often offer these and other computing resources as services that rely upon virtualization techniques. For example, virtualization technologies may be used to provide users the ability to control or utilize compute instances (e.g., a VM using a guest operating system (OS) that operates using a hypervisor that may or may not further operate on top of an underlying host OS, a container that may or may not operate in a VM, an instance that can execute on "bare metal" hardware without an underlying hypervisor), where one or multiple compute instances can be implemented using a single electronic device. Thus, a user may directly utilize a compute instance provided by an instance management service (sometimes called a hardware virtualization service) hosted by the provider network to perform a variety of computing tasks. Additionally or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

The resources that support both the services offering computing-related resources to users and those computing-related resources provisioned to users may be generally referred to as the provider network substrate. Such resources typically include hardware and software in the form of many networked computer systems. The traffic and operations of the provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane includes customer resources that are implemented on the provider network (e.g., computing instances, containers, block storage volumes, databases, file storage). Data plane traffic generally includes non-administrative operations such as transferring data to and from the customer resources. The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the provider network include a flag to indicate whether the traffic is control plane traffic or data plane traffic. In some embodiments, the payload of traffic may be inspected to determine its type (e.g., whether control or data plane). Other techniques for distinguishing traffic types are possible.

While some customer applications are readily migrated to a provider network environment, some customer workloads need to remain on premises ("on-prem") due to low latency, high data volume, data security, or other customer data processing requirements. Exemplary on-prem environments include customer data centers, robotics integrations, field locations, co-location facilities, telecommunications facilities (e.g., near cell towers), and the like. To satisfy customer requirements, the present disclosure relates to the deployment of a substrate-like resources on-prem. The term "provider substrate extension" (PSE) refers to a collection of resources (e.g., hardware, software, firmware, configuration metadata, and the like) that a customer can deploy on-prem (such as in a geographically separate location from the provider network) but that provides the same or similar functionality (e.g., virtualized computing resources) as are provided in the provider network. Such resources may be physically delivered as one or more computer systems or servers delivered in a rack or cabinet such as those commonly found in on-prem locations. The PSE can provide the customer with a set of features and capabilities that can be deployed on-prem similar to those features of a provider network described above. In effect, from the perspective of a customer of a provider network, a PSE represents a local extension of the capabilities of the provider network that can be set up at any desired physical location that can accommodate a PSE (e.g., with respect to physical space, electrical power, internet access, etc.). From the perspective of the provider network itself, a PSE may be considered to be virtually located in the same provider network data centers as the core provider network substrate while being physically located in a customer-selected deployment site. In at least some embodiments, the customer that is physically hosting the PSE can grant permissions to its own customers (e.g., other users of the provider network) to allow those users to launch instances to host their respective workloads within the PSE at the customer's on-prem location and, in some cases, to allow those workloads to access the customer's network.

In at least some embodiments, a PSE may be pre-configured, e.g., by the provider network operator, with the appropriate combination of hardware, software and/or firmware elements to support various types of computing-related resources, and to do so in a manner that meets various local data processing requirements without compromising the security of the provider network itself or of any other customers of the provider network. In at least some embodiments, a PSE generally is managed through the same or a similar set of interfaces that the customer would use to access computing-related resources of within the provider network. For example, the customer can provision, manage, and operate computing-related resources within their on-prem PSE or PSEs at various deployment sites through the provider network using the same application programming interfaces (APIs) or console-based interface that they would otherwise use to provision, manage, and operate computing-related resources within the provider network.

In at least some embodiments, resources of the provider network instantiate various networking components to ensure secure and reliable communications between the provider network and the PSE. Such components can establish one or more secure tunnels (e.g., VPNs) with the PSE. Such components can further divide control plane traffic and data plane traffic and process each type of traffic differently based on factors including the direction of the traffic (e.g., to or from the PSE). In at least some embodiments, a control plane service dynamically provisions and configures these networking components for deployed PSEs. Such a control plane service can monitor the networking components for each PSE and invoke self-healing or repair mechanisms designed to prevent communications with the PSE from being lost due to faults occurring within the provider network.

One service commonly offered to customers of a provider network is a block storage service that can act as virtualized persistent disk for instances, in that the instance is presented with a logical view of the physical storage resources, but mapping this logical storage space to the actual physical location of the storage is handled by a virtualization system. Volumes may be replicated one or more times to offer customers high availability and durability, with the replicas typically stored on different servers. A customer can attach one or more block storage volumes to an instance, and a client supporting the instance can perform block-based operations of the instance using the virtualized block storage volumes. For example, the customer may specify a particular instance should launch from a given boot volume (e.g., a volume containing an operating system) and have another attached volume to support data stored by a customer application that is executed by the instance. To provide a high degree of flexibility in terms of available storage, the provider network decouples the physical storage devices that support a given attached volume from the computing resources that support a given compute instance. Traditionally, a fleet of block storage servers supporting the block storage service would divide their attached physical storage devices (e.g., solid-state drives, magnetic drives, etc.) into many logical volumes. One block storage server might support the storage resources for hundreds or even thousands of instances. These block storage servers are typically executed in a "bare-metal" configuration—one in which the server software is executed within an operating system environment running directly on dedicated server hardware instead of on a virtual machine or within a container, for example.

Because the capacity in an extension of the provider substrate may be significantly limited compared to the capacity in an availability zone, this bare-metal block storage server design may not be as well suited for the substrate extension. For example, some substrate extensions may have only a single server (or another small number of servers), and so it may not be feasible to dedicate an entire server to block storage resources, thereby preventing use of that server for compute instances. In order to address this challenge, embodiments of the present disclosure virtualize the block storage service such that it can run within a compute instance, thereby enabling more flexible and efficient usage of the limited capacity. For example, a single server can be configured to host both a compute instance and an instance that virtualized its attached volume (e.g., a block storage server), providing a high degree of flexibility on the usage of the finite set of resources of a PSE. A single server may also be partitioned into isolated failure domains to host multiple block storage servers (and even multiple replicas of a volume). Failure domains generally refer to logical portions of a system that can fail without affecting other portions of the system. When executed on bare metal systems, a failure domain for a block storage system typically corresponded to an entire bare-metal computer system. By decoupling a failure domain from a per-server basis to a sub-server basis using virtualization, redundancies in the underlying hardware used to support block storage server instances can be exploited to increase the number of number of failure domains within a PSE. As a result, the block storage servers can individually manage smaller amounts of data such that when a failure occurs, the workload to recover the data associated with the failure is reduced. These block storage instances can be created as a virtual private cloud (VPC), and the instance clients that communicate with the block storage volumes can also communicate in this same VPC. Beneficially, this enables leveraging of VPC encryption for more secure communications in the substrate extension.

However, virtualizing the block storage service in an extension of the provider substrate creates certain technical challenges, including initializing the block storage service from a boot volume (also referred to as a block storage service machine image) before there is any block storage service running on the substrate extension that would be capable of storing the boot volume. While a PSE provides low-latency compute resources to an on-prem facility, those resources are subject to increased delay when reaching back to the provider network. While the PSE could rely on block storage servers in the region of the provider network, such reliance would be subject to the increased delay and thus undesirable. As described in further detail below, embodiments of the present disclosure address this challenge via local boot techniques that can load a boot volume for a block storage server on local storage of a PSE from data stored in the region of the provider network, and then boot the block storage server to serve volumes to other instances launched within the PSE. Thus, the disclosed local boot techniques allow customers to use a block storage service machine image to launch an instance in a substrate extension even when the block storage service itself is not yet present in the substrate extension.

The disclosed systems and techniques also shield the provider network from potential security issues that could be enabled by connecting a PSE to the provider network. In some embodiments, PSEs can require secure networking tunnels from the customer site at which they are installed to the provider network substrate (e.g., the physical network of machines) in order to operate. These tunnels can include virtual infrastructure components hosted both in virtualized computing instances (e.g., VMs) and on the substrate. Examples of tunnel components include VPCs and proxy computing instances and/or containers running on computing instances. Each server in a PSE may use at least two tunnels, one for control plane traffic and one for data plane traffic. As described in further detail below, intermediary resources positioned along the network path between the provider network substrate and the PSE can securely manage traffic flowing between the substrate and the PSE In at least some embodiments, the provider network is a cloud provider network. A cloud provider network, or "cloud," refers to a large pool of accessible virtualized computing resources (such as compute, storage, and networking resources, applications, and services). The cloud can provide convenient, on-demand network access to a shared pool of configurable computing resources that can be programmatically provisioned and released in response to customer commands These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region can include two or more availability zones connected to one another via a private high-speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network). A PSE as described herein can also connect to one or more availability zones via a publicly accessible network.

The cloud provider network can include a physical network (e.g., sheet metal boxes, cables) referred to as the substrate. The cloud provider network can also include an overlay network of virtualized computing resources that run on the substrate. As such, network packets can be routed along a substrate network according to constructs in the overlay network (e.g., VPCs, security groups). A mapping service can coordinate the routing of these network packets. The mapping service can be a regional distributed look up service that maps the combination of overlay IP and network identifier to substrate IP so that the distributed substrate computing devices can look up where to send packets.

To illustrate, each physical host can have an IP address in the substrate network. Hardware virtualization technology can enable multiple operating systems to run concurrently on a host computer, for example as virtual machines on the host. A hypervisor, or virtual machine monitor, on a host allocates the host's hardware resources amongst various virtual machines on the host and monitors the execution of the virtual machines. Each virtual machine may be provided with one or more IP addresses in the overlay network, and the virtual machine monitor on a host may be aware of the IP addresses of the virtual machines on the host. The virtual machine monitors (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network for routing packets between endpoints.

As one skilled in the art will appreciate in light of this disclosure, certain embodiments may be capable of achieving various advantages, including some or all of the following: (a) enabling customers of a provider network operator to deploy a wide variety of applications in a location-independent manner using provider-managed infrastructure (e.g., PSEs) at sites selected by customers while still retaining the scalability, security, availability and other operational advantages made possible by a provider network, (b) reducing the amount of application data and results that have to be transferred over long distances, such as over links between customer data centers and provider network data centers, (c) improving the overall latencies and responsiveness of applications for which potentially large amounts of data may be consumed as input or produced as output, by moving the applications close to the data sources/destinations, and/or (d) improving the security of sensitive application data.

FIG. 1 is a block diagram illustrating an example provider network extended by a provider substrate extension located within a network external to the provider network according to at least some embodiments. Within a provider network 100, customers can create one or more isolated virtual networks 102. Customers can launch compute instances 101 within an IVN to execute their applications. These compute instances 101 are hosted by substrate addressable devices (SADs) that are part of the provider network substrate (not shown). Similarly, SADs that are part of the provider network substrate can host control plane services 104. Exemplary control plane services 104 include an instance management service (sometimes referred to as a hardware virtualization service) that allows a customer or other control plane service to launch and configure instances and/or IVNs, an object storage service that provides object storage, a block storage services that provides the ability to attach block storage devices to instances, database services that provide various database types, etc.

Note that the components illustrated within the provider network 100 can be treated as logical components. As mentioned, these components are hosted by the SADs of the provider network substrate (not shown). For example, the provider network substrate can host the instances 101 using containers or virtual machines that operate within isolated virtual networks (IVNs). Such containers or virtual machines are executed by SADs. As another example, the provider network substrate can host one or more of the control plane services 104 using SADs in a bare metal configuration (e.g., without virtualization). In at least some embodiments, a SAD refers to the software (e.g., a server) executed by the hardware that is addressable via a network address of the provider network rather than of another network (e.g., a customer network, an IVN, etc.). In at least some embodiments, a SAD may additionally refer to the underlying hardware (e.g., computer system) executing the software.

As illustrated, the provider network 100 is in communication with a provider substrate extension (PSE) 188 deployed within customer network 185 and a PSE 198 deployed within customer network 195. Each PSE includes one or more substrate addressable devices (SADs), such as SADs 189A-189N illustrated within PSE 188. Such SADs 189 facilitate the provisioning of computing-related resources within the PSE. Note that the illustration of a solid box-ellipses-dashed box combination for a component, such as is the case for SADs 189A-189N, generally is used to indicate that there may be one or more of those components in this and subsequent drawings (although references in the corresponding text may refer to the singular or plural form of the component and with or without the letter suffix). A customer gateway/router 186 provides connectivity between the provider network 100 and the PSE 188 as well as between the PSE 188 and other customer resources 187 (e.g., other on-prem servers or services connected to the customer network 185). Similarly, a customer gateway/router 196 provides connectivity between the provider network 100 and the PSE 198 as well as between the PSE 198 and other customer resources 197. Various connectivity options exist between the provider network 100 and PSEs 198, such as a public network like the internet as shown for PSE 188 or a direct connection as shown for PSE 198.

Within the provider network 100, control plane traffic 106 generally (though not always) is directed to SADs, while data plane traffic 104 generally (though not always) is directed to instances. For example, some SADs can vend an API that allows for the launch and termination of instances. A control plane service 104 can send a command via the control plane to the API of such a SAD to launch a new instance in IVN 102.

An IVN, as suggested by the name, may comprise a set of hosted (e.g., virtualized) resources that is logically isolated or separated from other resources of the provider network (e.g., other IVNs). A control plane service can set up and configure IVNs, including assigning each IVN an identifier to distinguish it from other IVNs. The provider network can offer various ways to permit communications between IVNs, such as by setting up peering relationships between IVNs (e.g., a gateway in one IVN configured to communicate with a gateway in another IVN).

IVNs can be established for a variety of purposes. For example, an IVN may be set up for a particular customer by setting aside a set of resources for exclusive use by the customer, with substantial flexibility with respect to networking configuration for that set of resources being provided to the customer. Within their IVN, the customer may set up subnets, assign desired private IP addresses to various resources, set up security rules governing incoming and outgoing traffic, and the like. At least in some embodiments, by default the set of private network addresses set up within one IVN may not be accessible from another IVN (or more generally from outside the IVN).

Tunneling techniques facilitate the traversal of IVN traffic between instances hosted by different SADs on the provider network 100. For example, a newly launched instance within IVN 102 might have an IVN address A and be hosted by a SAD with a substrate address X, while the instance 101 might have IVN address B and be hosted by a SAD with a substrate address Y. To facilitate communications between these compute instances, SAD X encapsulates a packet sent from the newly launched instance to the instance 101 (from IVN address A to IVN address B) within a payload of a packet having addressing information of the SADs that host the respective instances (from substrate address X to substrate address Y). The packet sent between the SADs can further include an identifier of IVN 102 to indicate the data is destined for IVN 102 as opposed to another IVN hosted by the SAD with substrate address Y. In some embodiments, the SAD further encrypts the packet sent between instances within the payload of the packet sent between SADs using an encryption key associated with the IVN. In at least some embodiments, the encapsulation and encryption are performed by a software component of the SAD hosting the instance.

For PSEs, the provider network 100 includes one or more networking components to effectively extend the provider network substrate outside of the provider network 100 to the PSE connected to the customer's on-prem network. Such components can ensure that data plane and control plane operations that target a PSE are securely, reliably, and transparently communicated to the PSE. In the illustrated embodiment, a PSE interface 108, a PSE SAD proxy 110, and a PSE SAD anchor 112 facilitate data and control plane communications between the provider network 100 and the PSE 188. Similarly, a PSE interface 118, a PSE SAD proxy 120, and a PSE SAD anchor 122 facilitate data and control plane communications between the provider network 100 and the PSE 198. As described herein, PSE interfaces receive control and data plane traffic from the provider network, send such control plane traffic to a PSE SAD proxy, and send such data plane traffic to a PSE. PSE interfaces also receive data plane traffic from the PSE and send such data plane traffic to the appropriate destination within the provider network. PSE SAD proxies receive control plane traffic from PSE interfaces and send such control plane traffic to PSE SAD anchors. PSE SAD anchors receive control plane traffic from PSE SAD proxies and send such control plane traffic to a PSE. PSE SAD anchors also receive control plane traffic from a PSE and send such control plane traffic to a PSE SAD proxy. PSE SAD proxies also receive control plane traffic from PSE SAD anchors and send such control plane traffic to the appropriate destination within the provider network. Other embodiments may employ different combinations or configurations of networking components to facilitate communications between the provider network 100 and PSEs (e.g., the functionality of the PSE interface, PSE SAD proxy, and/or PSE SAD anchors may be combined in various ways such as by an application that performs the operations of both a PSE interface and a PSE SAD proxy, of both a PSE SAD proxy and a PSE SAD anchor, of all three components, and so on).

As indicated above, each PSE has one or more substrate network addresses for the SADs (e.g., SADs 189A-189N). Since those substrate addresses are not directly reachable via the provider network 100, the PSE interfaces 108, 118 masquerade with attached virtual network addresses (VNAs) matching the substrate addresses of the respective PSE. As illustrated, the PSE interface 108 has attached VNA(s) 150 that match the PSE 188 SAD address(es), and the PSE interface 118 has attached VNA(s) 152 that match the PSE 198 SAD address(es)). For example, traffic destined for a SAD with Internet Protocol (IP) address 192.168.0.10 within PSE 188 is sent to PSE interface 108 having an attached virtual address of 192.168.0.10, and traffic destined for a SAD with IP address 192.168.1.10 within PSE 198 is sent to PSE interface 118 having an attached virtual address of 192.168.1.10. Note that IPv4 or IPv6 addressing may be used. In at least some embodiments, a VNA is a logical construct enabling various networking-related attributes such as IP addresses to be programmatically transferred between instances. Such transfers can be referred to as "attaching" a VNA to an instance and "detaching" a VNA from an instance.

At a high level, a PSE interface is effectively a packet forwarding component that routes traffic based on whether that traffic is control plane traffic or data plane traffic. Note that both control and data plane traffic are routed to a PSE interface as both are destined for a SAD given the substrate addressing and encapsulation techniques described above. In the case of control plane traffic, a PSE interface routes the traffic to the PSE SAD proxy based on the SAD address. In the case of data plane traffic, a PSE interface establishes and serves as an endpoint to one or more encrypted data plane traffic tunnels between the provider network 100 and PSEs (e.g., tunnel 191 between PSE interface 108 and PSE 188, tunnel 193 between PSE interface 118 and PSE 198). For data plane traffic received from the provider network 100, a PSE interface encrypts the traffic for transmission over the tunnel to the PSE. For data plane traffic received from the PSE, the PSE interface decrypts the traffic, optionally validating the SAD-addressing of the packets, and sends the traffic to the identified SAD destination via the provider network 100. Note that if the PSE interface receives traffic from the PSE that does not conform to the expected format (e.g., protocol) used to transmit data plane traffic, the PSE interface can drop such traffic. Further note that if the PSE interface can validate addressing of the encapsulated packet to ensure that the originator of the traffic (e.g., an instance hosted by the PSE within a particular IVN) is permitted to send traffic to the addressed destination (e.g., an instance hosted by provider network within the same or a different IVN).

Each SAD in the PSE has a corresponding group of one or more PSE interfaces and each member of the group establishes one or more tunnels for data plane traffic with the PSE. For example, if there are four PSE interfaces for a PSE having four SADs, the PSE interfaces each establish a secure tunnel with a data plane traffic endpoint for each of the SADs (e.g., sixteen tunnels). Alternatively, a group of PSE interfaces may be shared by multiple SADs by attaching the associated VNAs to each member of the group.

Each PSE has one or more PSE SAD proxies and one or more PSE SAD anchors that handle control plane traffic between the provider network 100 and the SADs of a PSE. Control plane traffic typically has a command-response or request-response form. For example, a control plane service of the provider network 100 can issue a command to a PSE SAD to launch an instance. Since management of PSE resources is facilitated from the provider network, control plane commands sent over the secure tunnel typically should not originate from a PSE. At a high level, a PSE SAD proxy acts as a stateful security boundary between the provider network 100 and a PSE (such a boundary is sometimes referred to as a data diode). To do so, a PSE SAD proxy can employ one or more techniques such as applying various security policies or rules to received control plane traffic. Note that other control plane services 104 can indirectly or directly offer a public-facing API to allow instances hosted by a PSE to issue commands to the provider network 100 via non-tunneled communications (e.g., over a public network such as the internet).

For traffic originating from within the provider network 100 and destined for a PSE, a PSE SAD proxy can provide a control plane endpoint API of its corresponding SAD within the PSE. For example, a PSE SAD proxy for a PSE SAD that can host instances can provide an API consistent with one that can receive control plane operations to launch, configure, and terminate instances. Depending on the API call and associated parameters destined for a PSE SAD and received by a PSE SAD proxy, the PSE SAD proxy can perform various operations. For some operations, the PSE SAD proxy can pass the operation and associated parameters without modification through to the destination SAD. In some embodiments, a PSE SAD proxy can verify that the parameters of a received API call from within the provider network 100 are well-formed relative to the API before passing through those operations.

For some API calls or associated parameters, the PSE SAD can act as an intermediary to prevent sensitive information from being sent outside of the provider network 100. Exemplary sensitive information includes cryptographic information such as encryption keys, network certificates, etc. For example, a PSE SAD proxy can decrypt data using a sensitive key and re-encrypt the data using a key that can be exposed to a PSE. As another example, a PSE SAD proxy can terminate a terminate a first secure session (e.g., a Transport Layer Security (TLS) Session) originating from within the provider network 100 and create a new secure session with the corresponding SAD using a different certificate to prevent provider network certificates from leaking to the PSE. Thus, a PSE SAD proxy can receive certain API calls from within the provider network 100 that includes sensitive information and issue a substitute or replacement API call to the PSE SAD that replaces the sensitive information.

For traffic originating from a PSE and destined for the provider network 100, a PSE SAD proxy can drop all control plane commands or requests that originate from the PSE or only those commands or requests not directed to a public-facing control plane endpoint within the provider network, for example.

In some embodiments, a PSE SAD proxy can process responses to control plane operations depending on the nature of an expected response, if any. For example, for some responses, the PSE SAD proxy can simply drop the response without sending any message to the originator of the corresponding command or request. As another example, for some responses the PSE SAD proxy can sanitize the response to ensure it complies with the expected response format for the corresponding command or request before sending the sanitized response to the originator of the corresponding command or request via control plane traffic 107. As yet another example, the PSE SAD proxy can generate a response (whether immediately or upon receipt of an actual response from the SAD) and send the generated response to the originator of the corresponding command or request via control plane traffic 107.

As part of acting as a security boundary between the provider network 100 and a PSE, a PSE SAD proxy can track the state of communications between components of the provider network (e.g., control plane services 104) and each SAD of the PSE. State data can include session keys for the duration of sessions, pending outbound API calls with an associated source and destination to track outstanding responses, the relationship between API calls received from within the provider network 100 and those API calls that were issued to a SAD with replaced or substituted sensitive information, etc.

In some embodiments, the PSE SAD proxy can provide stateful communications for other PSE-to-provider network communications in addition to control plane traffic. Such communications can include Domain Name System (DNS) traffic, Network Time Protocol (NTP) traffic, and operating system activation traffic (e.g., for Windows activation).

In some embodiments, only certain components of a PSE are capable of serving as endpoints for encrypted control plane traffic tunnels with the provider network 100. To provide redundancy and reliability for the connection between the provider network 100 and PSE, a PSE SAD anchor can serve as the provider-network side endpoint for each of the available tunnel endpoints of the PSE. As illustrated, PSE SAD anchor(s) 112 serve to tunnel control plane traffic to the PSE 188 via tunnel 190, and PSE SAD anchor(s) 122 serve to tunnel control plane traffic to the PSE 1198 via tunnel 192.

Various embodiments can limit the radial impact of any attempted attacks originating from outside of the provider network (e.g., from should a PSE become comprised) both by using the techniques to process traffic described above as well as by isolating those networking components exposed to traffic from other portions of the provider network 100. In particular, the networking components can operate within one or more IVNs to bound how far an attacker could penetrate thereby protecting both the operations of the provider network and of other customers. Accordingly, various embodiments can instantiate the PSE interfaces, PSE SAD proxies, and the PSE SAD anchors as applications executed by virtual machines or containers that execute within one or more IVNs. In the illustrated embodiment, groups of PSE interfaces for different PSEs run within a multi-tenant IVN (e.g., the PSE interface IVN 132 for PSEs 188 and 198). In other embodiments, each group of PSE interfaces can run in a single-tenant IVN. Furthermore, each group of PSE SAD proxies and each group of PSE SAD anchors for a given PSE run within single-tenant IVNs (e.g., the PSE SAD proxy IVN 134 for PSE 188, the PSE SAD anchor IVN 136 for PSE 188, the PSE SAD proxy IVN 138 for PSE 198, and the PSE SAD proxy IVN 40 for PSE 198).

Note that the redundancy provided by operating multiple instances for each of the networking components (e.g., PSE interfaces, PSE SAD proxies, and PSE SAD anchors) allows the provider network to periodically recycle the instances hosting those components without interrupting PSE-to-provider network communications. Recycling can involve, for example, restarting instances or launching new instances and reconfiguring the other instances with, for example, the address of the recycled instance. Periodic recycling limits the time window during which an attacker could leverage a compromised network component should one become compromised.

A PSE connectivity manager 180 manages the setup and configuration of the networking components providing the connectivity between the provider network 100 and the PSEs. As mentioned above, the PSE interfaces 108, 118, the PSE SAD proxies 110, 120, and the PSE SAD anchors 112, 122 can be hosted as instances by the provider network substrate. The PSE connectivity manager 180 can request or initiate the launch of PSE interface(s), PSE SAD proxy/proxies, and PSE SAD anchor(s) for PSEs as PSEs are shipped to customers and/or as those PSEs come online and exchange configuration data with the provider network. Furthermore, the PSE connectivity manager 180 can further configure the PSE interface(s), PSE SAD proxy/proxies, and PSE SAD anchor(s). For example, the PSE connectivity manager 180 can attach the VNA(s) that correspond to the SADs of the PSE to the PSE interface(s), provide the PSE interface(s) with the address of the PSE SAD proxy/proxies for the PSE SADs, and provide the PSE SAD proxy/proxies with the address of the PSE SAD anchor(s) for the PSE. Furthermore, the PSE connectivity manager 180 can configure the IVNs of the various components to allow, for example, communications between the PSE interface IVN 132 and a PSE SAD proxy IVN for the PSE, and between the PSE SAD proxy IVN to the PSE SAD anchor IVN for the PSE.

Note that to facilitate the establishment of tunnels 190-193, the tunnel endpoints can have one or more attached VNAs or assigned physical network addresses that can receive traffic from outside of their respective network (e.g., from outside of the provider network for PSE interfaces and PSE SAD anchors, from outside of the customer network for the tunnel endpoints of the PSE). For example, the PSE 188 can have a single outward-facing network address and manage communications to multiple SADs using port address translation (PAT) or multiple outward-facing network addresses. Each PSE SAD anchor 112, 122 can have or share (e.g., via PAT) an outward-facing network address, and each PSE interface 108, 118 can have or share (e.g., via PAT) an outward-facing accessible network address.

Figure 2:
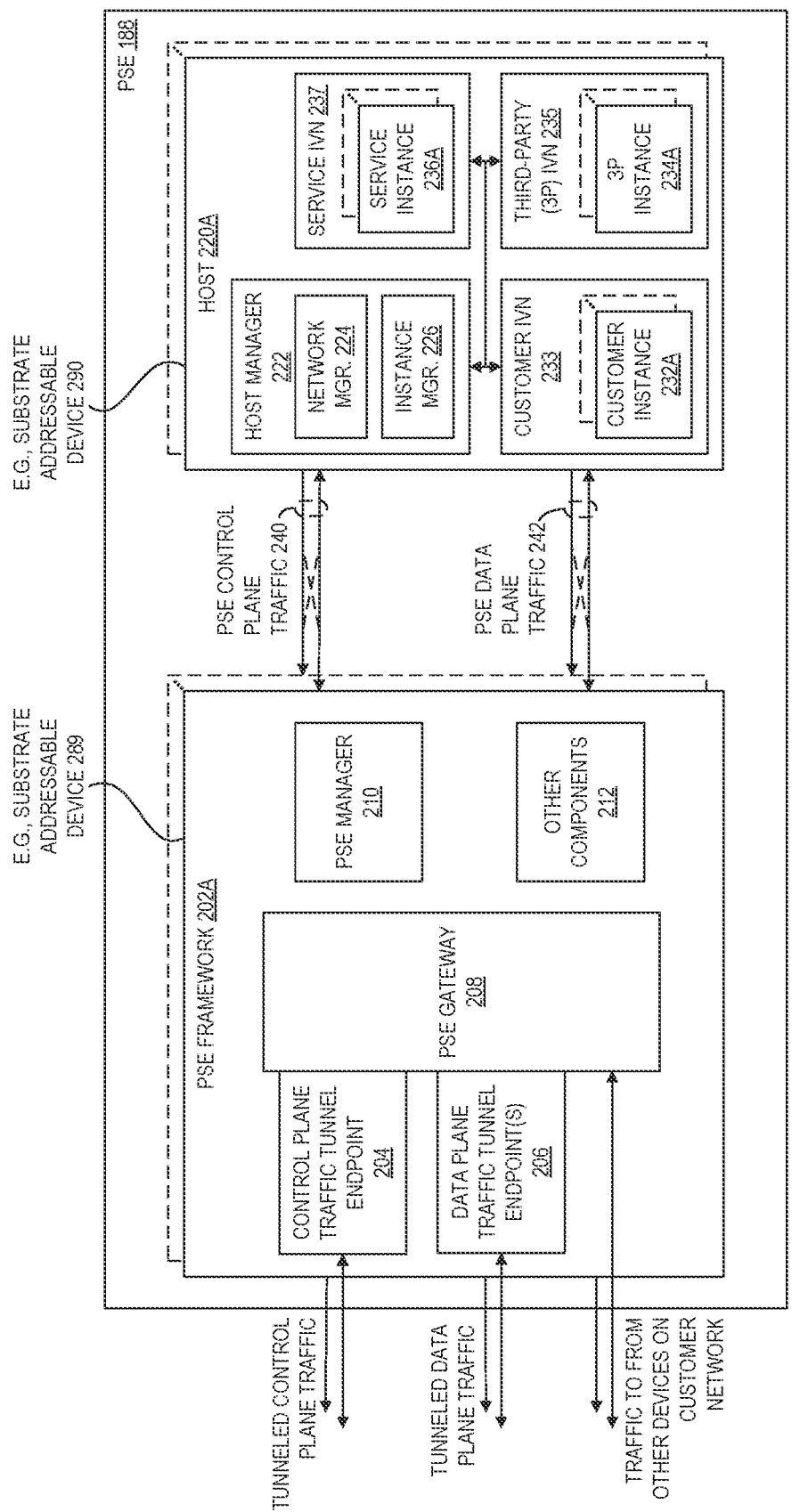
FIG. 2 is a block diagram illustrating an example provider substrate extension according to at least some embodiments.

FIG. 2 is a block diagram illustrating an example provider substrate extension according to at least some embodiments. In the illustrated embodiment, the PSE 188 includes one or more PSE frameworks 202 and one or more hosts 220. At a high level, each host 220 can be functionally (and, possibly, structurally) similar to at least some of the computer systems that form portions of the provider network substrate (e.g., those substrate resources that host instances within the provider network), while the PSE framework(s) 202 provide supporting infrastructure to emulate the provider network substrate within the PSE as well as to provide connectivity to the provider network via control and data plane traffic tunnels (e.g., tunnels 190-193 of FIG. 1).

In at least some embodiments, each PSE framework 202 can send or receive control or data plane traffic from each host 220 and vice versa in a mesh like architecture, as indicated by PSE control plane traffic 240 and PSE data plane traffic 242. Such redundancy allows for reliability levels that a customer might expect from the provider network.

The PSE framework 202 includes one or more control plane tunnel endpoints 204 that terminate encrypted tunnels carrying control plane traffic (e.g., tunnel 190, tunnel 192). In some embodiments, the provider network 100 hosts a PSE SAD anchor for each control plane tunnel endpoint 204. Back in the provider network, the PSE SAD proxy or proxies (e.g., proxies 110) can distribute control plane traffic to the PSE SAD anchors (e.g., anchors 112), effectively distributing the loading of control plane traffic across the PSE frameworks 202 of the PSE 188. The PSE framework 202 further includes one or more data plane tunnel endpoints 206 that terminate encrypted tunnels carrying data plane traffic (e.g., tunnel 191, tunnel 193) from the PSE interfaces of the provider network, which may be connected in a mesh like architecture (e.g., a given PSE interface 108 establishes a tunnel with the data plane tunnel endpoint 206 of each PSE framework 202).

As indicated above, packets of control plane traffic and packets of data plane traffic can include SADs as both source and destinations—the latter being encapsulated in a packet having SAD-based addressing. As illustrated, the PSE framework 202 is SAD 289, and the host 220 is SAD 290. Note that SADs within the PSE 188 (e.g., SAD 289, 290) can also provide secure session termination (e.g., TLS termination) for secure sessions established with the corresponding PSE SAD proxy or proxies within the provider network (e.g., PSE SAD proxies 110).

SADs vend one or more control plane APIs to handle control plane operations directed to the SAD that manage the resources of the SAD. For example, a PSE manager 210 of a PSE framework 202 can vend a control plane API for management of the components of the PSE framework 202. One such component is a PSE gateway 208 that routes control and/or data plane traffic into and out of the PSE 188, such as control plane traffic destined for SAD 289 to the PSE manager 210 and control or data plane traffic destined for SAD 290 to the host manager 222. The PSE gateway 208 can further facilitate communications with the customer network, such as to or from the other customer resources 187 accessible via the network of the PSE deployment site (e.g., the customer network 185).

The API of the PSE manager 210 can include one or more commands to configure the PSE gateway 208 of the PSE framework 202. Other components 212 of the PSE framework 202 can include various applications or services that take part in the operation of the substrate of the PSE for the hosts 220, such as DNS, Dynamic Host Configuration Protocol (DHCP), and/or NTP services.

A host manager 222 can vend a control plane API for management of the components of the host 220. In the illustrated embodiment, the host manager 222 includes an instance manager 224 and a network manager 226. The instance manager 224 can handle API calls related to management of the host 220, including commands to launch, configure, and/or terminate instances hosted by the host 220. For example, an instance management service in the provider network (not shown) can issue a control plane command to the instance manager 224 to launch an instance on host 220. As illustrated, the host 220 is host to a customer instance 232 running inside of a customer IVN 233, a third-party (3P) instance 234 running inside of a 3P IVN 235, and a service instance 236 running inside of a service IVN 237. Note that each of these IVNs 233, 234, 235 can extend existing IVNs established within the provider network. The customer instance 232 may be executing some customer application or workload, the 3P instance 234 may be executing the application or workload of another party that the customer has permitted to launch instances within the PSE 188, and the service instance 236 may be executing a service of the provider network locally to offer to the PSE 188 (e.g., a block storage service, a database service, etc.).

The network manager 226 can handle SAD-addressed data plane traffic received by the host 220. For such traffic, the network manager can perform the requisite decapsulation of an IVN packet before sending it to the addressed, hosted instance. Furthermore, the network manager 226 can handle the routing of traffic sent by hosted instances. When a hosted instance attempts to send traffic to another locally hosted instance (e.g., on the same host), the network manager 226 can forward that traffic to the addressed instance. When a hosted instance attempts to send traffic to a non-local instance (e.g., not on the same host), the network manager 226 can locate the substrate address of the device hosting the non-local instance, encapsulate and optionally encrypt the corresponding packet into a SAD-addressed packet, and send that packet over the data plane (e.g., either to another host within the PSE or back to the provider network via the PSE gateway 208. Note that the network manager 226 can include or have access to various data that facilitates routing of data plane traffic (e.g., to look up the address of the SAD hosting an instance having a IVN network address in the destination of a packet received from a hosted instance).

Figure 3:
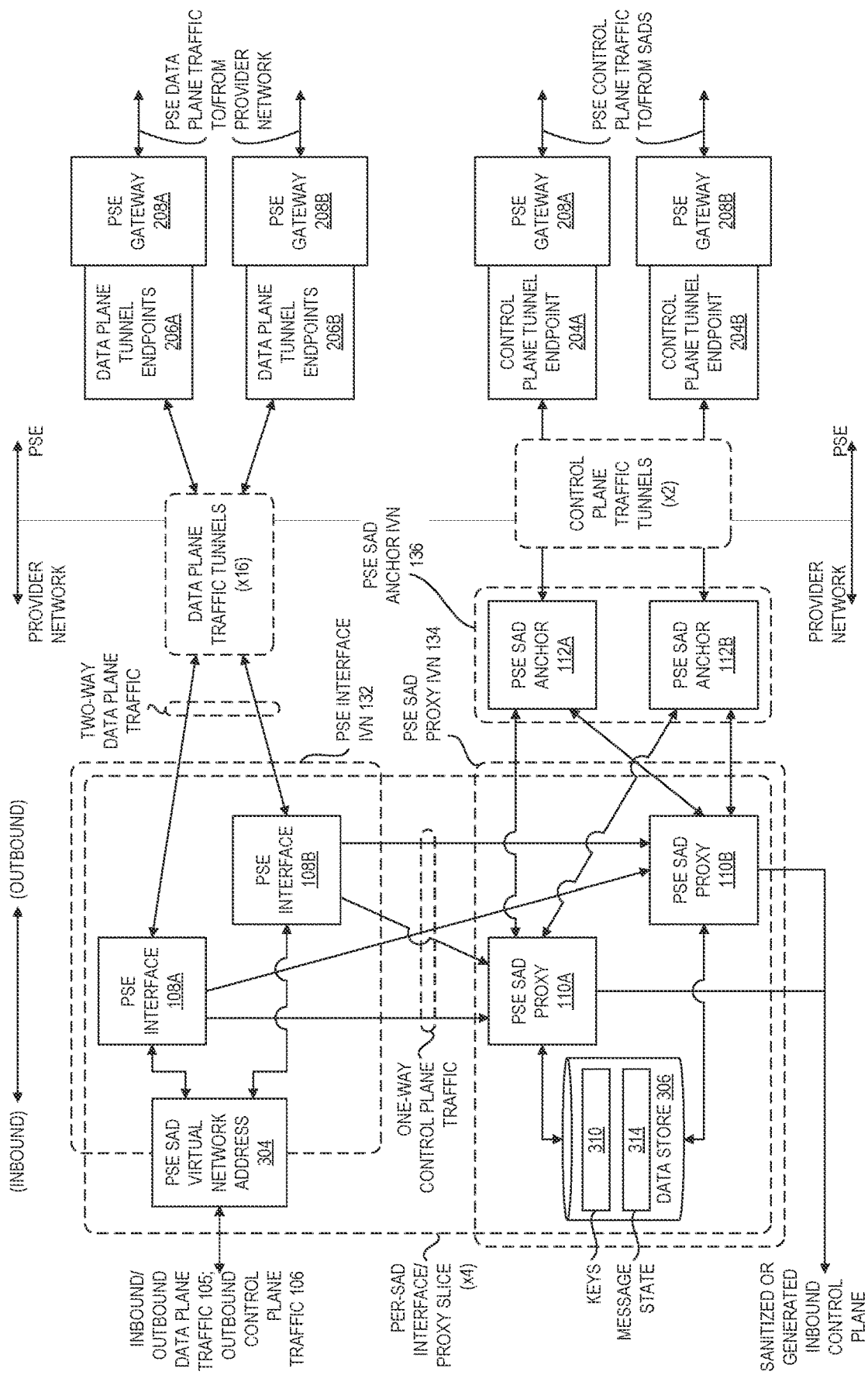
FIG. 3 is a block diagram illustrating an example connectivity between a provider network and a provider substrate extension according to at least some embodiments.

FIG. 3 is a block diagram illustrating an example connectivity between a provider network and a provider substrate extension according to at least some embodiments. In particular, FIG. 3 illustrates an exemplary connectivity between a provider network and a PSE. Note that for FIG. 3, and as indicated at the top of the figure, the term "inbound" refers traffic received by the provider network from the PSE, and the term "outbound" refers to traffic sent by the provider network to the PSE. Although not illustrated, for this example assume the PSE includes two PSE frameworks 202 and two hosts 220 for a total of four SADs. The PSE frameworks provide tunnel endpoints 204A, 204B for control plane traffic tunnel endpoints 206A, 206B for data plane traffic. Outbound traffic is decrypted and sent to the destination within the PSE substrate via the PSE gateways 208A, 208B.

For each of the four SADs, the provider network includes a VNA, one or more PSE interfaces, and one or more PSE SAD proxies. In this example, the provider network includes a PSE SAD VNA 304, two PSE interfaces 108A, 108B and two PSE SAD proxies 110A, 110B for a given PSE SAD. Together, the PSE interface(s) and PSE SAD proxy/proxies can be referred to as a slice as indicated, each slice corresponding to a particular SAD within the PSE. In other embodiments, the PSE interface(s) may be shared by all of the VNAs for a VPN rather than a single VNA for one of the SADs.

The PSE SAD VNA 304 serves as a front for a given PSE through which other components of the provider network can send traffic to and receive traffic from the corresponding SAD of the PSE. A load balancer (not shown) can route outbound traffic sent to the PSE SAD VNA 304 to one of the PSE interfaces 108A, 108B. The illustrated PSE interfaces 108A, 108B for a given slice and those for the other slices (not shown) operate within a PSE interface IVN 132. The PSE interfaces 108A, 108B send data plane traffic to the PSE via data plane traffic tunnels and control plane traffic to the PSE by forwarding the control plane traffic to the PSE SAD proxies 110A, 110B of the slice. The PSE interfaces 108A, 108B store (or have access to) the network addresses of the PSE SAD proxy/proxies of the associated SAD, the network addresses of the data plane tunnel endpoint(s), and one or more keys of or associated with the data plane tunnel endpoint(s) of the PSE for securing communications with those endpoint(s).

In at least some embodiments, the PSE interfaces 110A, 110B establish a secure tunnel for data plane traffic with each data plane tunnel endpoint 206A, 206B resulting in N data plane tunnels where N is the number of PSE interfaces per-SAD (assuming each SAD has the same number of interfaces) multiplied by the number of data plane tunnel endpoints multiplied by the number of SADs. In this example, sixteen data plane tunnels are established between the PSE interfaces and the data plane tunnel endpoints (i.e., 2 PSE interfaces per-SAD x 2 data plane tunnel endpoints x 4 SADs).

The PSE SAD proxies 110A, 110B receive control plane traffic from the PSE interfaces 108A, 108B, perform various operations described elsewhere herein, and send the control plane traffic to the PSE via either of the two PSE SAD anchors 112A, 112B. Similarly, the PSE SAD proxies 110A, 110B receive control plane traffic from either of the two PSE SAD anchors 112A, 112B, perform various operations described elsewhere herein, and control plane traffic 107 to destinations within the provider network. The illustrated PSE SAD proxies 110A, 110B for a given slice and those for the other slices (not shown) operate within a PSE SAD proxy IVN 134. The PSE interfaces 108A, 108B store (or have access to) the network addresses of the PSE SAD anchor(s).

In at least some embodiments, the PSE SAD proxies have access to a shared data store 306 or otherwise are capable of exchanging information. Such information exchange can be used for a number of reasons. For example, recall that the PSE SAD proxies can vend an API interface to emulate the API interface of the associated SAD within the PSE. Since some communications can be stateful and various load balancing techniques may prevent the same PSE SAD proxy from handling all communications for a given set of operations, one PSE SAD proxy may need to access the state of communications that were previously handled by a different PSE SAD proxy (e.g., the PSE SAD proxy 110A sends a control plane operation to the PSE and the PSE SAD proxy 110B receives a response to the control plane operation from the PSE). For inbound control plane traffic, the PSE SAD proxies can check whether the inbound message is consistent with the expected state and, if so, send a message via control plane traffic 107 as described elsewhere herein. If not, the PSE SAD proxies 110A, 110B can drop the traffic. As another example, recall that the PSE SAD proxies can bridge separate secure sessions (e.g., TLS sessions) to prevent provider network certificates from being sent to the PSE. Again, since the PSE SAD proxy that handles an outbound message may be different than the PSE SAD proxy that handles the response to that message, the PSE SAD proxy handling the responsive message can use the same key that was established between the originator of the outbound message and the PSE SAD proxy that handled the outbound message in order to send a secure responsive message via control plane traffic 107 to the originator.

In this example, each PSE framework provides for a single control plane tunnel endpoint 204. For each of the available control plane tunnel endpoints 204, the provider network includes a PSE anchor. In this example, the provider network includes two PSE anchors 112A, 112B. The PSE SAD anchors 112A, 112B operate within a PSE SAD anchor IVN 136. The PSE anchors 112 receive control plane traffic from each of the eight PSE SAD proxies (two per slice for each of the four SADs) and send that traffic to the PSE. The PSE anchors also receive control plane traffic from the PSE and send that traffic to one of the two PSE SAD proxies associated with the SAD that sourced the traffic from the PSE. The PSE anchors 112A, 112B store (or have access to) the network addresses of the PSE SAD proxy/proxies for each SAD, the network addresses of the control plane tunnel endpoint(s) of the PSE, and one or more keys of or associated with the control plane tunnel endpoint(s) of the PSE for securing communications with those endpoint(s).

In at least some embodiments, the network components or provider network may employ load balancing techniques to distribute the workload of routing control and data plane traffic between the provider network and the PSE. For example, traffic sent to the PSE SAD VNA 304 can be distributed among the PSE interfaces 108A, 108B. As another example, each PSE interface 108 can distribute traffic among the data plane tunnel endpoints 206A, 206B. As yet another example, each PSE interface 108 can distribute traffic among the PSE SAD proxies 110A, 110B. As yet another example, each PSE SAD proxy 110 can distribute outbound traffic among the PSE SAD anchors 112A, 112B. As yet another example, the PSE SAD anchors 112 can distribute inbound traffic among the PSE SAD proxies 110A, 110B. In any case, such load balancing can be performed by the sending entity or by a load balancer (not shown). Exemplary load balancing techniques include employing a load balancer with a single VNA that distributes traffic to multiple components "behind" that address, providing each data sender with the address of multiple recipients and distributing the selected recipient at the application level, etc.

Note that although the embodiments illustrated in FIGS. 1-3 show the establishment of separate tunnels for control plane traffic and data plane traffic, other embodiments might employ a one or more tunnels for both control and data plane traffic. For example, the PSE interfaces can route data plane traffic to PSE SAD anchors for transmission over a shared to tunnel to the PSE, bypassing the additional operations carried out by the PSE SAD proxies on the control plane traffic.

Figure 4:
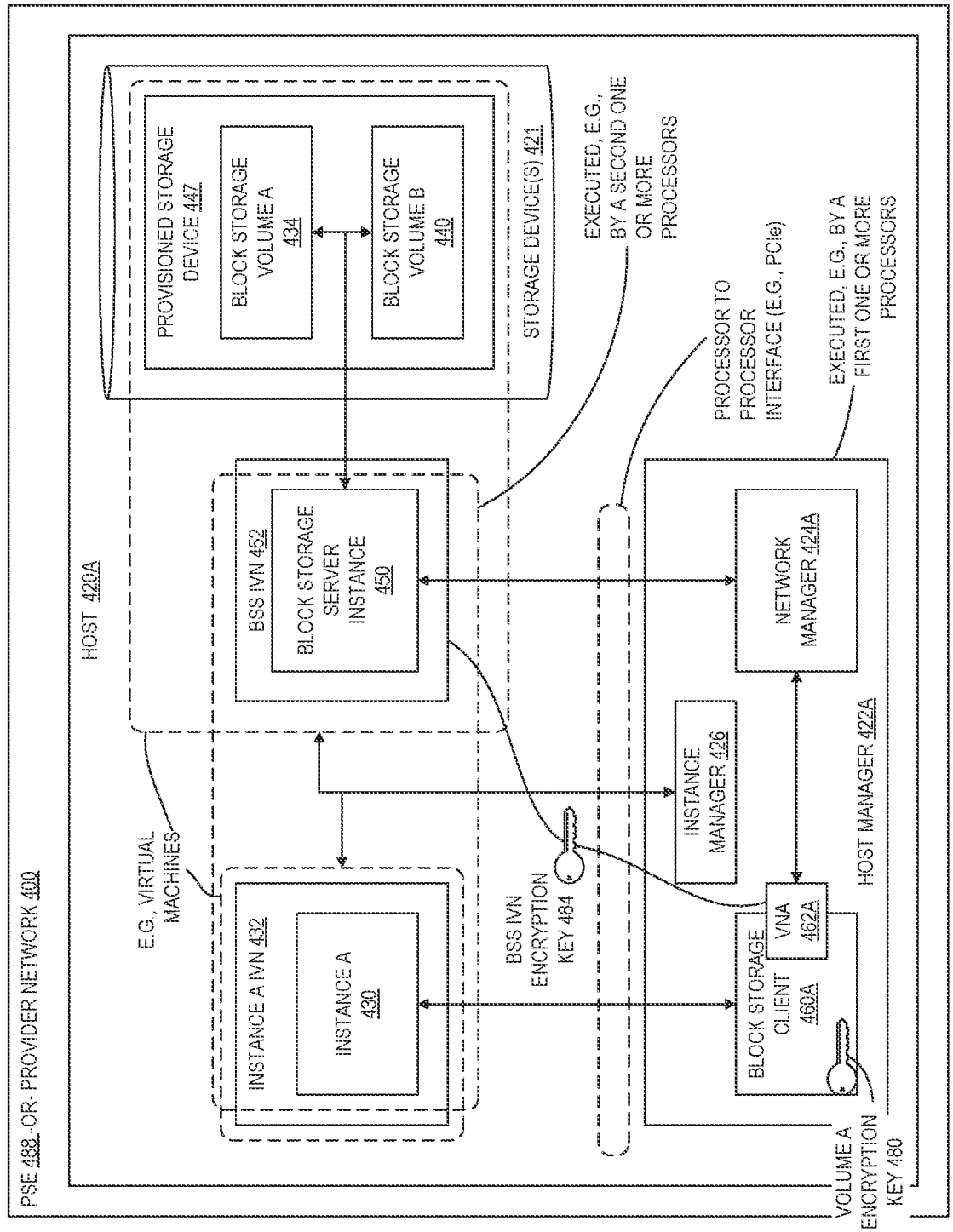
FIGS. 4 and 5 are block diagrams illustrating example virtualized block storage systems according to at least some embodiments.
Figure 5:
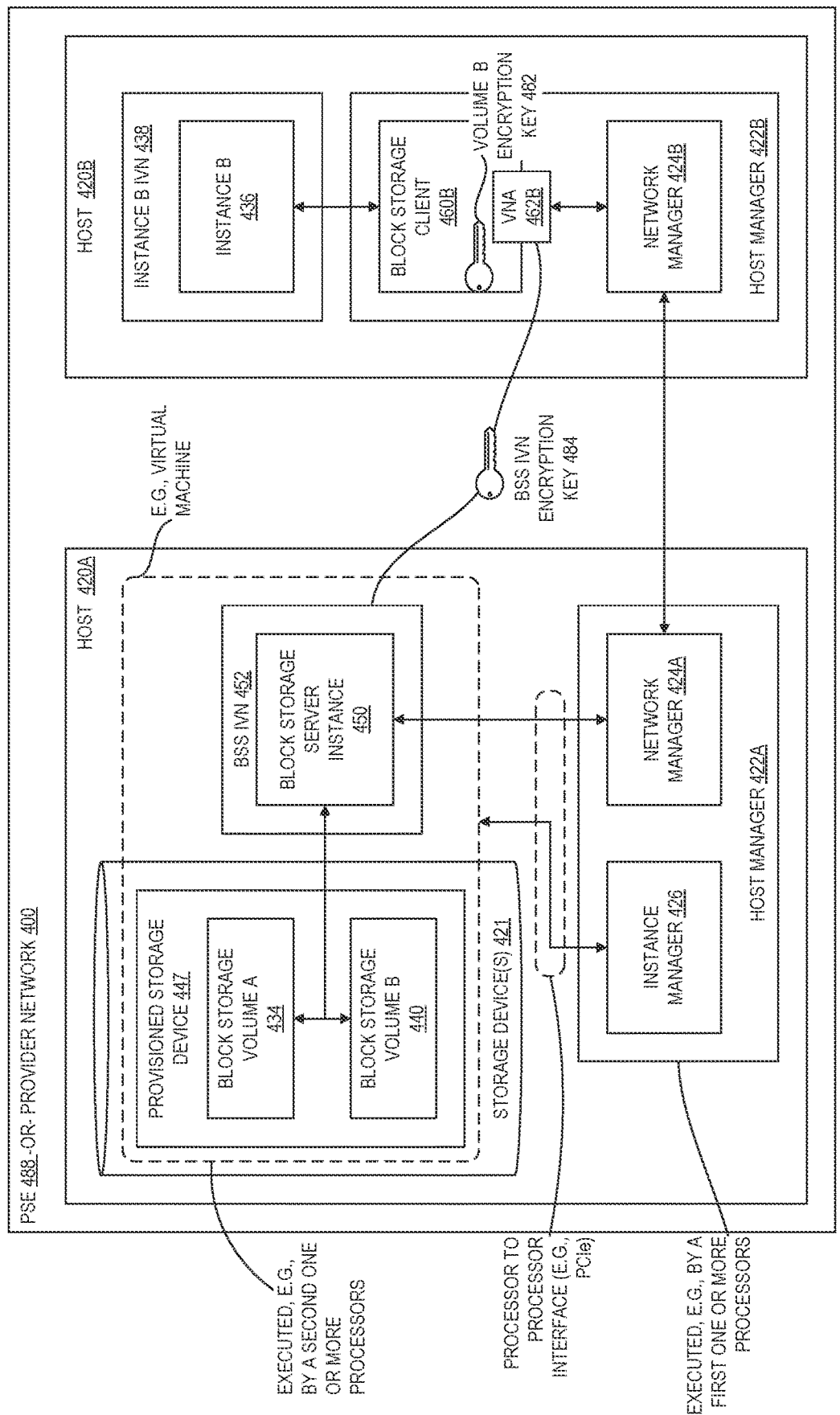

FIGS. 4 and 5 are block diagrams illustrating example virtualized block storage systems according to at least some embodiments. As illustrated in FIG. 4, a provider network 400 or PSE 488 includes a host 420A. The host 420A is host to a block storage server instance 450. In hosting the block storage server instance 450, the host 420A has provisioned some amount of the host storage device(s) 421 as a provisioned storage device 447 (e.g., a virtual drive or disk) for the block storage server instance 450). The block storage server instance 450 can partition the provisioned storage device 447 and create and host volumes on behalf of other instances. An instance management service (not shown) of the provider network 400 can initiate the launch of such a block storage server instance either on a host of the provider network 400 or a host of the PSE 488 via an instance manager 426. The instance manager 426 may be a virtual machine manager (VMM), hypervisor, or other virtualization program that can provision host resources (e.g., compute, memory, network, storage) for an instance (e.g., a virtual machine) and launch and terminate instances.

The host 420A is also host to an instance A 430 within an instance IVN 432. The block storage server instance 450 provides a block storage volume A 434 to instance A 430 and a block storage volume B 440 to another instance (not shown). The host 420A includes a block storage client 460A through which hosted instances access block storage volumes hosted by a block storage server (e.g., by providing a virtual block storage interface to the instance). In particular, the block storage clients 460 can be software programs that intercept or otherwise receive block storage operations issued to a volume "attached" to an instance (e.g., the block storage volume A 434 attached to instance A 430).

As illustrated in FIG. 5, the provider network 400 or PSE 488 includes two hosts 420A and 420B. Again, the host 420A is host to a block storage server instance 450. The host 420B is host to an instance B 436 within an instance IVN 438. The block storage server instance 450 provides a block storage volume B 440 to instance B 436. The hosts 420B includes a block storage client 460B through which hosted instances access block storage volumes hosted by a block storage server.

When a volume is attached to an instance, the block storage client obtains a mapping that relates the volume to the block storage server instance(s) hosting the replica. The block storage client can open a communication session (e.g., via a network-based data transfer protocol) with each of the block storage server instances. Upon receiving a block storage operation from an instance, the block storage client issues operations to the appropriate block storage server(s) to fulfill the operation of the instance. For example and with reference to FIG. 4, the instance A 430 can issue a read of a block of data at a given block address (e.g., a logical block address or LBA) from the volume A 434. The block storage client 460A receives the read operation and issues an operation including the requested block address to the block storage server instance 450 based on the mapping data of the instance-attached volume A 434 to the block storage server instance 450. Upon receiving the data from the block storage server instance 450, the block storage client 460A provides the data to the instance A 430. A similar series of operations can be carried out between the instance B 436, the block storage client 460B, the block storage server instance 450, and the volume B 440 of FIG. 5.

With reference to FIGS. 4 and 5, block storage messaging between block storage clients and block storage server instances can be sent using a network-based data transfer protocol such as Global Network Block Device (GNDB). Such messages can be encapsulated as data plane traffic and routed between the block storage clients 460 and the block storage server 450 by network managers 424 of the respective hosts, as described elsewhere herein. In some embodiments where the block storage server instance is hosted by the same host as the instance issuing the block storage operation, the block storage client can issue the associated operation via the network-based data transfer protocol to a network manager which in turn can internally route the operation to the hosted block storage server instance. In other embodiments where the block storage server instance is hosted by the same host as the instance issuing the block storage operation, the block storage client can issue the associated operation via a PCIe or other interconnect that resides between the block storage client and hosted instances, thereby avoiding the protocol packing associated with a network-based transfer.

With reference to FIGS. 4 and 5, systems can deploy various levels of encryption to secure block storage data. To provide end-to-end encryption of block storage traffic, the block storage server instance 452 executes within a block storage service (BSS) IVN 452, which may include any number of block storage server instances and span from a provider network to a PSE. The block storage clients 460 have VNAs 462 that are associated with the block storage service IVN 452. In this manner, IVN-level encryption using a block storage service IVN encryption key 484 can be used to encrypt and decrypt traffic sent between the block storage server instance 450 and block storage clients 460. Note that the encryption and decryption of traffic carried via the block storage service IVN may be performed by the network manager at the endpoints of the IVN. For example, the network manager 424B encrypts traffic sent from the block storage client 460B via VNA 462B. As another example, the network manager 424A decrypts traffic sent to instances hosted within the BSS IVN 452, including the block storage server instance 450. To provide at-rest encryption of data, the block storage volumes may further have volume-level encryption. For example, volume A 434 can be encrypted with a volume A encryption key 480, and volume B 440 can be encrypted with a volume B encryption key 482. Using the encryption key 480, the block storage client 460A encrypts data written by instance A 430 to volume A 434 and decrypts data read by instance A 430 from volume A 434. Using the encryption key 482, the block storage client 460B can perform similar encryption and decryption operations between instance B 436 and volume B 440. Note that in some embodiments, a policy may be in place that prevents a block storage server instance hosting a volume from being hosted on the same host as the instance attached to that volume to prevent the volume encryption key from being on the same host as the volume it encrypts (e.g., so that the volume A encryption key 480 and the volume A 434 are not on the host 420A).

In some embodiments, the instances and host managers are executed by different processor(s) as indicated in FIGS. 4 and 5. For example, the block storage server instance 450 can be executed a first processor (e.g., processor 1710) and the host manager 422A can be executed by a second processor (e.g., processor 1775). The processor(s) executing the block storage server instance access the storage device(s) of the host of the via one or more interconnects. For example, the processor(s) executing the block storage server instance 450 (e.g., processor 1710) may access the storage device(s) 421 (e.g., storage device 1780) via an PCIe interconnect between the two. As another example, the processor(s) executing the block storage server instance 450 may access the storage device(s) 421 via a first PCIe bus to the processor or system-on-a-chip executing the host manager 422A (e.g., processor 1775), which in turn bridges those communications via a second PCIe bus to the storage device(s) 421.

Although illustrated as single volumes in FIGS. 4 and 5, each instance volume 434, 440 may be mirrored across multiple replicas stored on multiple different block storage servers to provide a high degree of reliability to the system. For example, one replica might be referred to as primary replica that processes reads from and writes to (input and output operations, or "I/O") the volume, and the server hosting that primary replica can synchronously propagate writes to the other, secondary replicas. If the primary replica fails, one of the secondary replicas is selected to serve as the primary replica (referred to as failover). Replicas may be subdivided (e.g., striped) into partitions, with each partition of a given replica stored on a different server to facilitate parallel reads and writes. Replicas may also be encoded with redundancy (e.g., parity bits) so that when a block storage server becomes unavailable (e.g., due to a server or disk failure), the lost data can be recovered from the available data. As a result, an instance-attached volume may be hosted by many block storage servers.

Figure 6:
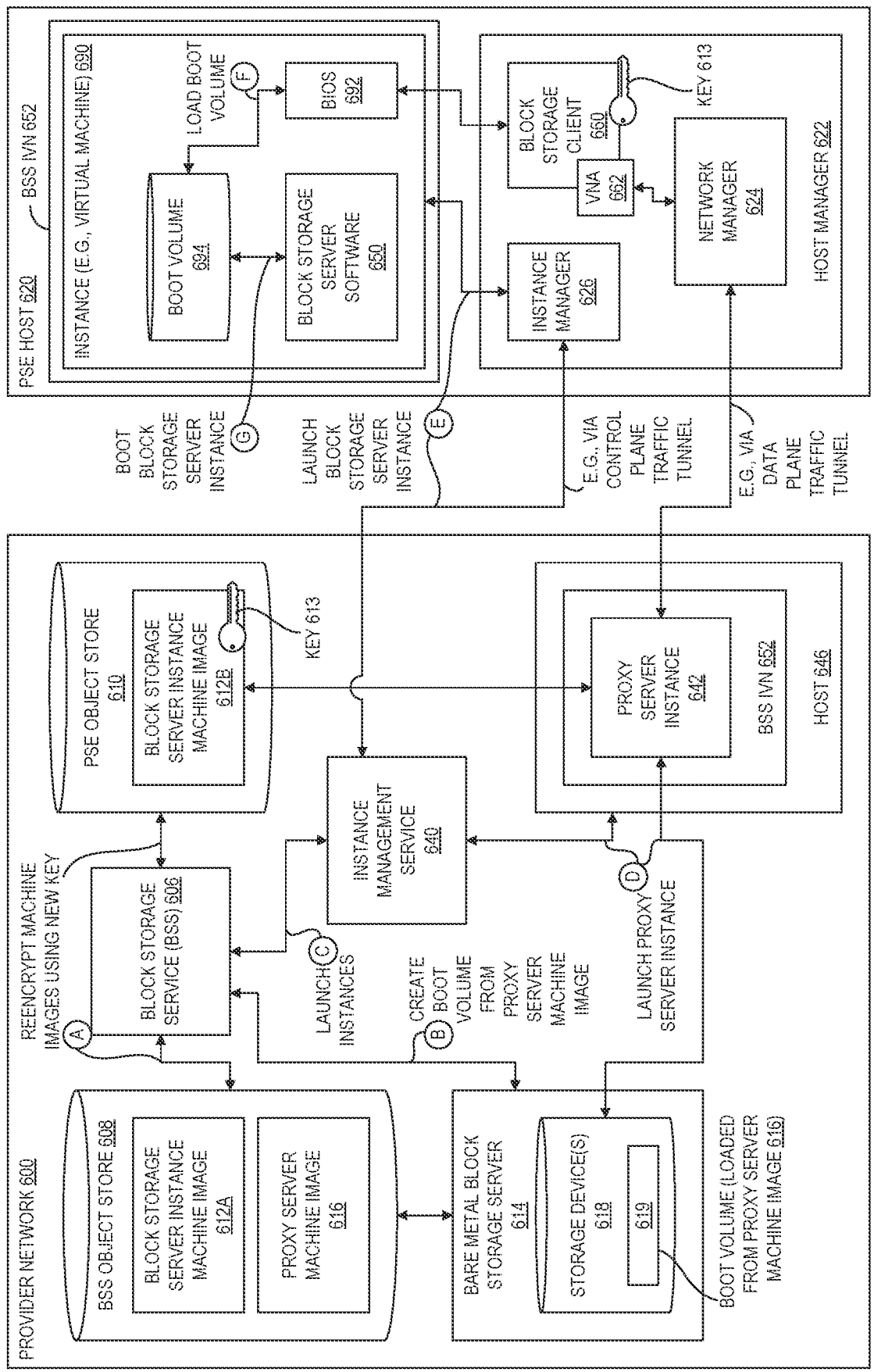
FIG. 6 is a block diagram illustrating an example system for booting a virtualized block storage server using a first technique according to at least some embodiments.
Figure 7:
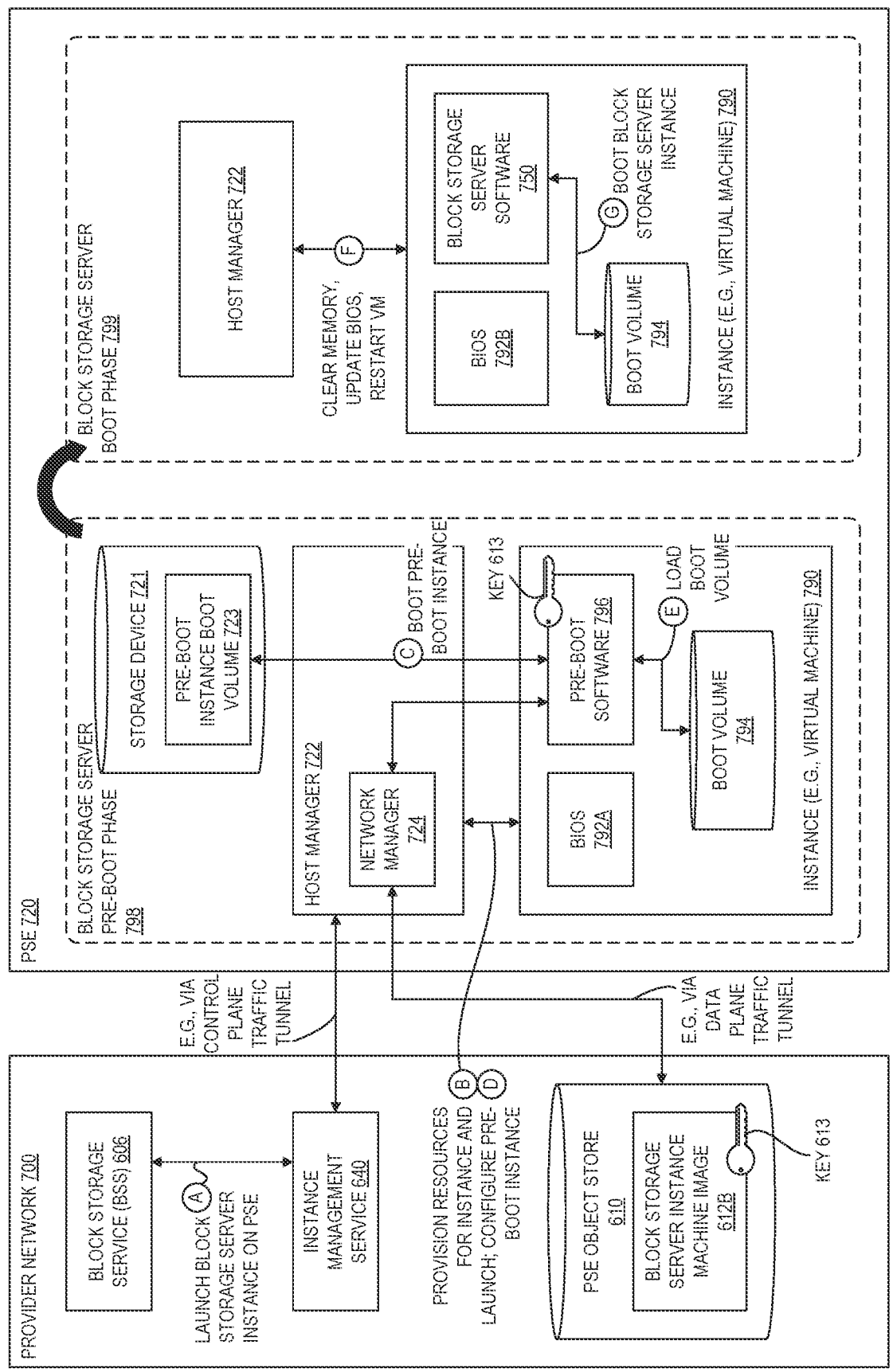
FIG. 7 is a block diagram illustrating an example system for booting a virtualized block storage server using a second technique according to at least some embodiments.

One challenge associated with hosting block storage servers in a virtualized context is booting those servers. How does a block storage server instance boot from a boot volume hosted by a block storage server instance if there are no operational block storage server instances? This is particularly challenging in the context of PSEs that may not include a dedicated (or bare-metal) block storage server. FIGS. 6 and 7 depict example local boot techniques for booting a first or "seed" block storage server instance—a block storage server instance from which other instances can be launched—within a PSE. Once launched, other instances can be launched from the seed block storage server instance.

FIG. 6 is a block diagram illustrating an example system for booting a virtualized block storage server using a first technique according to at least some embodiments. At a high level, FIG. 6 illustrates an example of remotely booting a block storage server 650 within an instance 690 via a proxy server hosted within the provider network 600. A block storage service (BSS) 606 of a provider network 600 provides users with the ability to create block storage volumes and attach those volumes to instances. For example, a user (e.g., a customer of the provider network, another service of the provider network) can submit commands via an API or console which are relayed through to the BSS 606 to create, resize, or delete volumes that are managed by the BSS, and to attach or detach those volumes to instances. The BSS 606 maintains a BSS object store 608 that contains volume snapshots. Snapshots can be considered a type of object, which, like a file, can include the object data and metadata about the object (e.g., time of creation, etc.). A volume snapshot is a copy (or backup) of a volume at a given point in time allowing the recreation of that volume on physical or virtual drives. Snapshots can generally be divided into boot volumes and non-boot volumes, the former facilitating the booting of software executed within an instance. A machine image may be a group of one or more snapshots for a given instance, including a boot volume.

In some embodiments, the BSS 606 applies object-level encryption of objects in the BSS object store 608. To prevent the leakage of the encryption keys used within the provider network 600, the BSS 606 can further manage a PSE object store 610, re-encrypting objects to be sent to a given PSE using a different encryption key than the one used to encrypt objects in the BSS object store 608. In this example, a block storage server instance machine image 612A will be used to boot the block storage server 650 on a host 620 of a PSE. As indicated at circle A, the BSS 606 decrypts the block storage server instance machine image 612A using the key kept within the provider network 600 and re-encrypts it as a block storage server instance machine image 612B using a key 613 that can be sent to the PSE.

An IVN can provide security for traffic between block storage server instances and block storage clients. In some embodiments, the BSS 606 manages that IVN, illustrated as BSS IVN 652. The host 620 on which the block storage server 650 will be launched includes a host manager 622 having a block storage client 660 with an associated VNA 662 in the BSS IVN 652. To facilitate communications between the block storage client 660 and the provider network 600 over the BSS IVN 652, the BSS 606 launches a proxy server instance 642 within the BSS IVN 652. The proxy server instance 642 can provide a block-storage like interface to the block storage client 660 to allow the client 660 to access the block storage server instance machine image 612B. The BSS 606 launches a proxy server instance 642 as follows.

As indicated at circle B, the BSS 606 first sends a message to the bare metal block storage server 614 to create a new logical volume to serve as the boot volume for the proxy server instance 642. The bare metal block storage server 614 creates a new logical volume 619 on its one or more storage devices 618 of the bare metal server 614 and loads the volume 619 with the proxy server machine image 616 stored in the BSS object store 608.

As indicated at circle C, the BSS 606 initiates the launch of the proxy server instance 642 with an instance management service 640. The instance management service 640 is another control plane service of the provider network 600 that facilitates the launching of instances within the provider network 600 or a PSE. In some embodiments, the instance management service 640 may track or have access to host utilization metrics that indicate how "hot" a host is—that is, metrics such as CPU, memory, and network utilization. For example, the instance management service 640 or another service may periodically poll hosts to obtain utilization metrics. The instance management service 640 can identify a host to host an instance in response to a launch request by accessing the metrics associated with a pool of potential hosts (subject to any constraints on the host location such as within a given PSE) and selecting a host having low utilization (e.g., below some threshold or thresholds). In requesting the launch of the proxy server instance 642, the BSS 606 specifies that the instance should be launched within the BSS IVN 652 and from the volume 619. As indicated at circle D, the instance management service 640 identifies a host 646 to host the instance and sends a message to the host 646 to launch the instance. An instance manager (not shown) of the host 646 provisions resources of the host for the proxy server instance 642 and launches it from boot volume 619.

The BSS 606 also initiates the launch of the block storage server 650 via the instance management service 640. The BSS 606 specifies that the instance should be launched within the BSS IVN 652 on a particular PSE (e.g., with a PSE identifier) and from a boot volume made available by the proxy server instance 642. As indicated at circle E, the instance management service 640 identifies the host 620 to host the block storage server instance 650 and sends a message to the host 620 to launch the instance (e.g., via a control plane traffic tunnel). As illustrated, the request to launch the instance is received by an instance manager 626 that can provision host resources for and launch and terminate instances. Here, the instance manager 626 creates an instance 690 to host the block storage server.

As part of configuring the instance 690, the instance manager 626 can configure a basic input/output system (BIOS) 692 of the instance 690 to load a virtual boot volume 694 with the block storage server instance machine image 612B via the proxy server instance 642. The BIOS 692 can include a block storage device driver (e.g., a non-volatile memory express (NVMe) driver) and have two attached block storage devices: the virtualized block storage device presented by the proxy server instance 642 via the block storage client 660 and the boot volume 694. Note that although illustrated within instance 690, the boot volume 694 corresponds to a volume on a virtual drive allocated to the instance 690 by the instance manager 626 from a storage device (not shown) of the host 620 which can be accessed via the block storage client 660 or another component of the host manager 622. Other embodiments may include an interface other than BIOS to connect the instance 690 to the two block devices (e.g., a Unified Extensible Firmware Interface (UEFI)).

During execution, the BIOS 692 (or other firmware such as UEFI) can load the boot volume 694 from the block storage server instance machine image 612B. When the block storage server instance machine image 612B is encrypted using the key 613, the block storage client 660 decrypts the block storage server instance machine image 612B during the loading process. Once the loading operation completes, the BIOS continues the boot process to boot the instance 690 from the boot volume D94 containing the block storage server software. In some embodiments, the BIOS 692 can detach the block storage device that corresponds to the proxy server instance 642 prior to booting the block storage server software 650.

Although illustrated and described using a proxy server instance 642, other embodiments may use a block storage server instance (not shown) launched from the block storage server instance machine image 612A to provide a block storage device to the instance 690 via the block storage client 660. The BSS 606 creates a volume on the virtual drive or disk of the launched block storage server instance and loads the volume with the block storage server instance machine image 612A. During the loading process, the block storage server instance decrypts the machine image using the provider network key and optionally encrypts the volume using a volume-specific key (e.g., such as how key 480 encrypted volume B 440), which the BSS 606 can provide to the block storage client 660.

FIG. 7 is a block diagram illustrating an example system for booting a virtualized block storage server using a second technique according to at least some embodiments. At a high level, FIG. 7 illustrates an example of remotely booting an instance 790 to execute block storage server software 750 via pre-boot software executed by the instance 790 prior to executing the block storage server software 750. In particular, a storage device 721 of a PSE 720 is pre-loaded (e.g., prior to shipment of the PSE) with a pre-boot instance boot volume 723. The pre-boot instance boot volume 723 contains software that can be booted on the instance during a block storage server pre-boot phase 798 to load another boot volume with the block storage server software. The instance can then restart and boot from the other boot volume to launch a block storage server instance during a block storage server boot phase 799.

As indicated at circle A, the BSS 606 initiates the launch of a block storage server instance with an instance management service 640, specifying the instance should be launched within a BSS IVN on a particular PSE. Again, the instance management service 640 identifies a host 620 of the PSE to host the block storage server instance 650 and sends a message to a host manager 722 of the host to launch the instance (e.g., via a control plane traffic tunnel). The request to launch the instance is received by an instance manager (not shown) of the host manager 722.

As indicated at circle B, the host manager 722 (or instance manager) provisions resources of the host for the instance 790 that will execute the block storage server 750. Additionally, the host manager 722 can configure a BIOS 792A (or UEFI) with two attached block storage devices—the block storage device interface presented by the block storage client (not shown) to the pre-boot instance boot volume 723 and the virtual boot volume 794 (such as the boot volume 694 described above)—and to boot from the pre-boot instance boot volume 723.

As indicated at circle C, the BIOS 792A proceeds to allow the boot of the pre-boot software 796 from the pre-boot instance boot volume 723. If the pre-boot instance boot volume 723 is based on a generic machine image, the host manager 722 may further have to update the configuration of the instance 790 to facilitate communications between the pre-boot software 796 and the provider network 700, as indicated at circle D. In particular, the host manager 722 can attach a VNA to the instance 790, provide the pre-boot software 796 with credentials to use when accessing the PSE object store 610, and provide a key to decrypt the machine image to be loaded to the boot volume 794. The VNA configuration, credentials, and key may have been passed to the host manager 722 as part of the request from the instance management service 640 to launch the instance.

As indicated at circle E, once the instance 790 is configured and executing the pre-boot software 796, the pre-boot software 796 copies the block storage server instance machine image 612B from the PSE object store 610 and loads it to the boot volume 794. As part of loading the boot volume 794, the pre-boot software 796 can decrypt the block storage server instance machine image 612B with the key 613, assuming it was encrypted. The host manager 722 can detect or the pre-boot software can signal the completion of the load of the boot volume 794. For example, the pre-boot software can initiate an instance restart when the boot volume 794 has loaded. As another example, the network manager 724 can detect the termination of the session between the instance 790 and the PSE object store 610 (e.g., when the TCP session is closed).

As indicated at circle F, the host manager 722 can update or otherwise reconfigure the BIOS 792A to 792B either during the data transfer or once the data transfer completes. Such a reconfiguration includes changing the boot volume from the pre-boot instance boot volume 723 to the boot volume 794 and removing the block storage device that includes the pre-boot instance boot volume 723. Prior to restarting the instance 790, the host manager 722 can further clear the memory provisioned to the instance 790 that may contain left over data written by the pre-boot software 796. Upon restarting the instance 790, the BIOS 792B boots the block storage server 750 from the boot volume 794.

Although FIGS. 6 and 7 depict example techniques for booting a block storage server instance within a PSE, other techniques are possible. For example, an instance manager can create a volume on a storage device of a PSE as part of provisioning resources for an instance to be launched. Prior to launching the instance, the instance manager can send a message to a control plane service (e.g., the block storage service or instance management service) to request a bootable snapshot to load to the volume. The control plane service can send the bootable snapshot to the instance manager via a control plane traffic tunnel. Once loaded, the instance manager can allow the instance software to launch.

Figure 8:
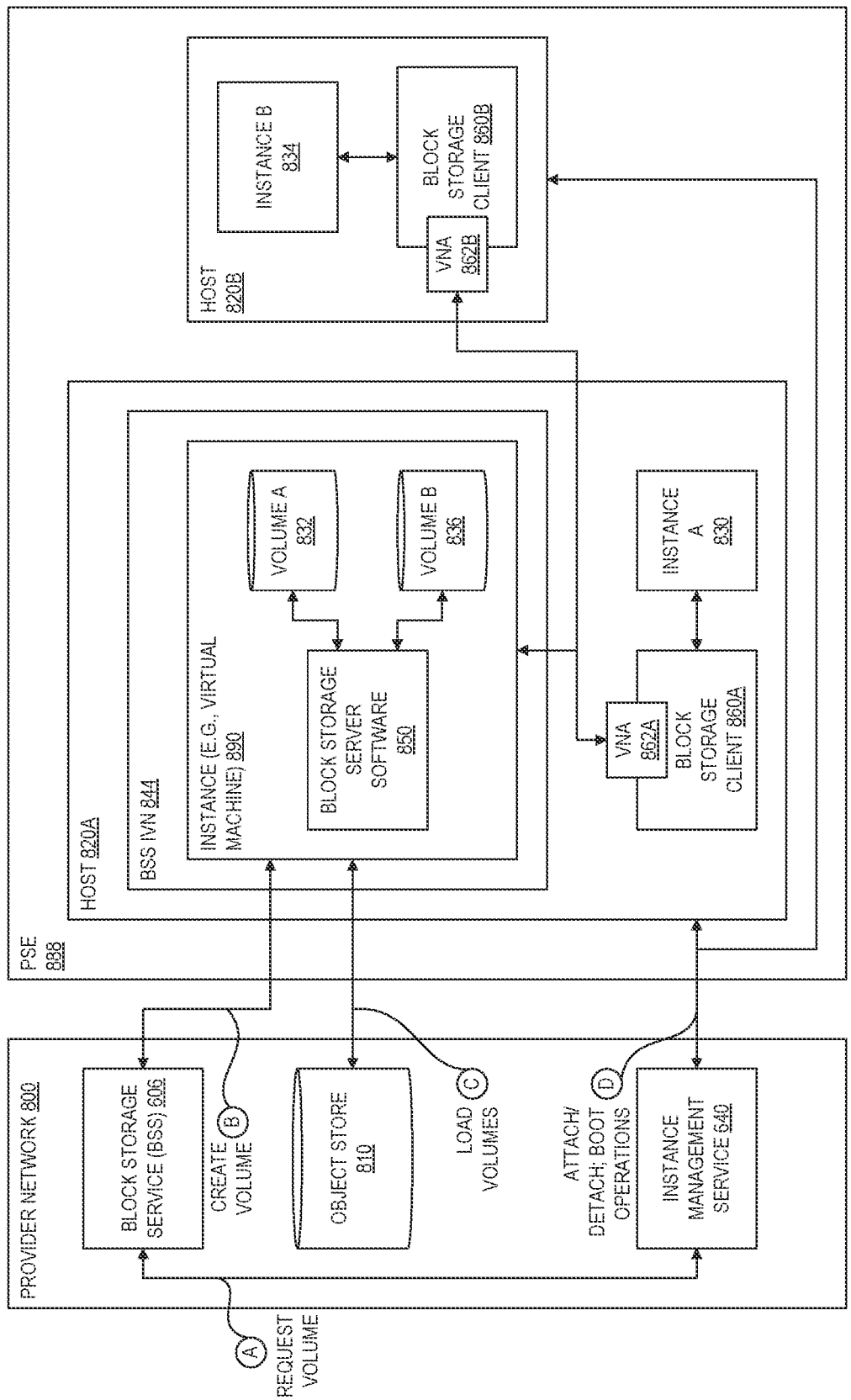
FIG. 8 is a block diagram illustrating an example system for booting additional compute instances in a provider substrate extension from a block storage server according to at least some embodiments.

FIG. 8 is a block diagram illustrating an example system for booting additional compute instances in a provider substrate extension from a block storage server according to at least some embodiments. Once a block storage server instance has been launched, such as using the techniques described with reference to FIG. 6 or 7, that "seed" block storage server instance can provide boot volumes for other instances (including other block storage server instances). This may be particularly useful in the context of a PSE where the seed block storage server instance is launched from a machine image transferred or hosted over a relatively slow connection between a provider network and the PSE as compared to the substrate interconnect of the PSE. In this example, an instance 890 has been launched on a host 820A of a PSE 888. The instance 890 is executing block storage server software 850 and operates within the BSS IVN 844. Additionally, block storage clients 860A and 860B have attached VNAs 862A and 862B that permit communication on the BSS IVN 844.

As indicated at circle A, the instance management service 640 of a provider network 800 can request that the BSS 606 create a new volume from a specified snapshot. As indicated at circle B, the BSS 606 can instruct the block storage server instance 890 to create volumes based on the specified snapshots. In some embodiments, the instance management service 640 may provide a volume-specific encryption key (e.g., key 680) to encrypt the volume.

As indicated at circle C, the block storage server instance 890 can create the volumes by fetching the specified snapshots from an object store 810, such as the PSE object store 610. Although not illustrated, in other embodiments, the object store 810 may be an object store hosted by a BSS cache instance on the PSE 888 to cache volume snapshots and/or machine images. The BSS 606 may manage the BSS cache instance, and a customer can specify to the BSS 606 that certain snapshots are to be loaded to the cache prior to any requests to launch an instance. In this manner, the block storage server instance 890 can create volumes from the cached boot volume snapshots, dramatically reducing the boot time of instances on the PSE by circumventing the delay associated with the data transfer from an object store in the provider network 800 to the block storage server instance 890.

As indicated at circle C, the instance management service 640 of the provider network 600 can issue commands to the hosts of the PSE 888 attach or detach volumes that are hosted by the block storage server instance 890 to other instances hosted by the PSE 888. For example, a volume A 832 may be loaded with a bootable snapshot. The instance management service 640 can instruct the host 820A to launch an instance A 830 using a volume identifier associated with the volume A 832. In response, the block storage client 860A can attach volume A 832 hosted by the block storage server instance 890 to the instance A 830 via the BSS IVN 844, thereby allowing the instance A 830 launch from the volume A 832. As another example, a volume B 836 may be loaded with a non-bootable snapshot that contains other data. The instance management service 640 can instruct a host 820B to attach the volume B 836 to a hosted instance 834. In response, the block storage client 860B can attach volume B 836 hosted by the block storage server instance 890 to the instance B 834 via the BSS IVN 844.

Figure 9:
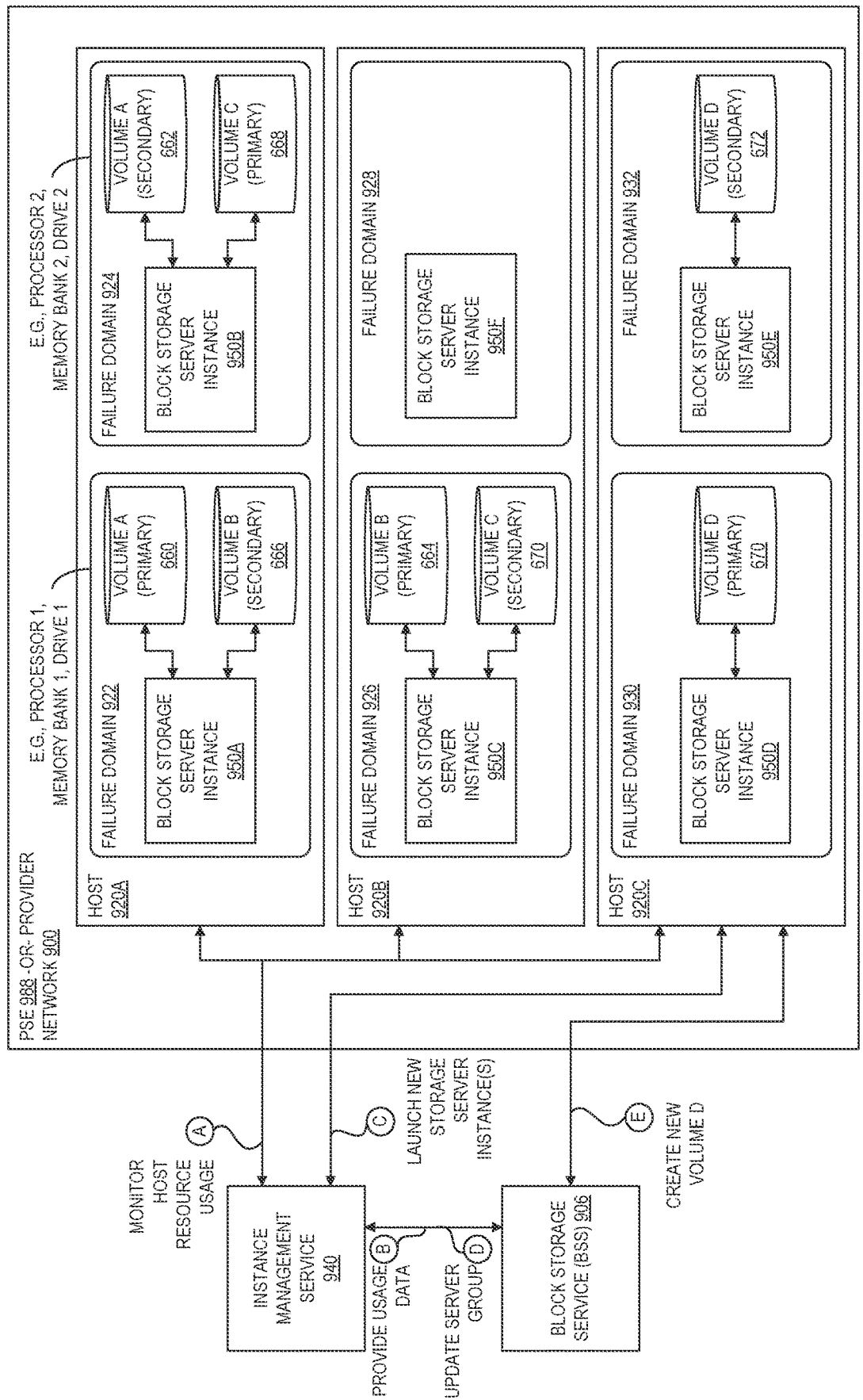
FIG. 9 is a block diagram illustrating an example system for managing virtualized block storage servers according to at least some embodiments.

FIG. 9 is a block diagram illustrating an example system for managing virtualized block storage servers according to at least some embodiments. Executing block storage servers within a virtualized environment has several benefits, including allowing an instance management service to automatically scale the number of executing block storage server instances with demand Rather than a BSS operating with a defined pool of bare-metal servers that is manually expanded, an instance management service can monitor the utilization of host resources (e.g., CPU, memory, network, etc.) and automatically adjust the number of block storage server instances that are running For example, if two hosts of block storage server instances are reporting high resource utilization, the instance management service can launch additional block storage server instances on hosts with lower resource utilization. The block storage service can then create volumes on the newly launched instances, thereby avoiding an increase in the workload of the block storage server instances that were running and possible degradation in performance Additionally, executing block storage servers as instances allows the number of failure domains to exceed the number of host computer systems by decoupling the failure domain from the computer system as a whole. Increasing the number of failure domains allows an increased number of block storage servers to be executed on a fixed set of hardware, and increasing the number of block storage servers reduces the overall footprint of data managed by any particular server. For example, suppose a system includes nine host computer systems that are not subdivided into smaller failure domains (i.e., one computer system is one failure domain). To avoid data loss, each host or failure domain executes a single block storage server. If those nine block storage servers host 90 terabytes (TB) of data (including encoding to allow for data recovery) across volumes for instances, each block storage server would store approximately 10 TB of data. If one of the hosts failed, that 10 TB would need to be recovered (e.g., from the other 80 TB). Such data recovery imposes data compute, transfer, and storage costs. If those nine hosts are sub-divided into two failure domains each and the number of block storage servers is increased to eighteen, each block storage server would store approximately 5 TB of data, approximately halving the amount of data that would need to be recovered (and the corresponding cost) in the event of a component failure in one of the failure domains.

In this example, a PSE 988 or a provider network 900 includes three hosts 920A, 920B, and 920C. Subject to the hardware design of a host, hosts can be treated as either a single failure domain or subdivided into two or more failure domains. Here, hosts 920 each include two failure domains. The host 920A includes a failure domain 922 and a failure domain 924 such that the components of one failure domain can continue to operate even if there is a failure of a component in another failure domain. For example, the failure domain 922 might correspond to first processor of a multi-processor system connected to a first memory bank (e.g., RAM) and using first set of one or more storage drives (e.g., SSDs), while the failure domain 924 might correspond to a second processor of the system connected to a second memory bank and using a second set of one or more storage drives. Note that some components may be shared across failure domains, such as a power supply, again subject to redundancies in the hardware design and how the failure domains are overlaid onto the hardware.

The host 920A is executing a block storage server instance 950A within the failure domain 922 and a block storage server instance 950B within the failure domain 924. The host 920B is executing a block storage server instance 950C within a failure domain 926 and a block storage server instance 950F within a failure domain 928. A volume A includes a primary replica 660 provided by the block storage server instance 950A and a secondary replica 662 provided by the block storage server instance 950B. A volume B includes a primary replica 664 provided by the block storage server instance 950C and a secondary replica 666 provided by the block storage server instance 950A. A volume C includes a primary replica 668 provided by the block storage server instance 950B and a secondary replica 670 provided by the block storage server instance 950C. Although illustrated as two replicas per volume, in practice each volume can have fewer or more replicas, and each replica may be divided amongst many different block storage server instances (e.g., via striping).

As indicated at circle A, an instance management service 940 monitors utilization of physical resources of hosts, such as processor utilization, memory utilization, storage utilization, and network utilization, which may be aggregated across a host, separated by failure domain, or on a per-resource basis (e.g., the instance management service 940 may receive metrics from the host 920A that indicate the average CPU utilization is 50%, the CPU utilization of the processor(s) of failure domain 922 is 50%, or the CPU utilization of a specific processor supporting failure domain 922 is 50%). The instance management service 940 can track the resource utilization of hosts in a database (not shown). Note that in addition to the block storage server instances, the illustrated failure domains can host other instances (e.g., customer instances) that contribute to the utilization of physical resources of hosts. The instance management service 940 can periodically update the BSS 906 with resource utilization metrics to allow the BSS 906 to select lower-usage block storage server instances when creating new volumes, as indicated at circle B.

As indicated at circle C, the instance management service 940 can launch a new block storage server instance when the resource utilization of hosts supporting block storage server instances exceeds one or more thresholds. The thresholds may be defined in various ways, such as on a per-resource basis aggregated across hosts (e.g., the average processor utilization of all processors executing block storage servers is above 50%), on some combination of resources across hosts (e.g., the storage utilization is above 80% and the processor utilization is above 50%), or on an individual resource and/or host basis. To avoid launching block storage server instances in failure domains that already host a block storage server instance, the instance management service 940 can track which failure domains are occupied and which are available (e.g., in the database containing resource usage metrics). Here, the instance management service 940 has determined the resource utilization of hosts 920A, 920B, and/or 920C has exceeded some threshold and launched new block storage server instances 950D and 950E in previously unoccupied failure domains 930 and 932, respectively, of the host 920C. While the failure domain 928 includes a block storage server 950F that is not hosting any volumes, the resource utilization of other instances hosted within that failure domain or of the aggregate resource utilization of the host 920B may be too high to support another block storage server instance.

As indicated at circle D, the instance management service 940 can update the BSS 906 to provide updated identification of the operating block storage instances 950 (now including block storage servers 950D and 950E). Based on the identified block storage instances 950 and resource utilization metrics received from the instance management service 940, the BSS 906 can create new volumes on the host 920C as indicated at circle E. Here, assuming host 920C exhibited low resource utilization as reported from the instance management service 940, the BSS 906 creates a new volume D including a primary replica 670 provided by the block storage server instance 950D and a secondary replica 672 provided by the block storage server instance 950E.

Figure 10:
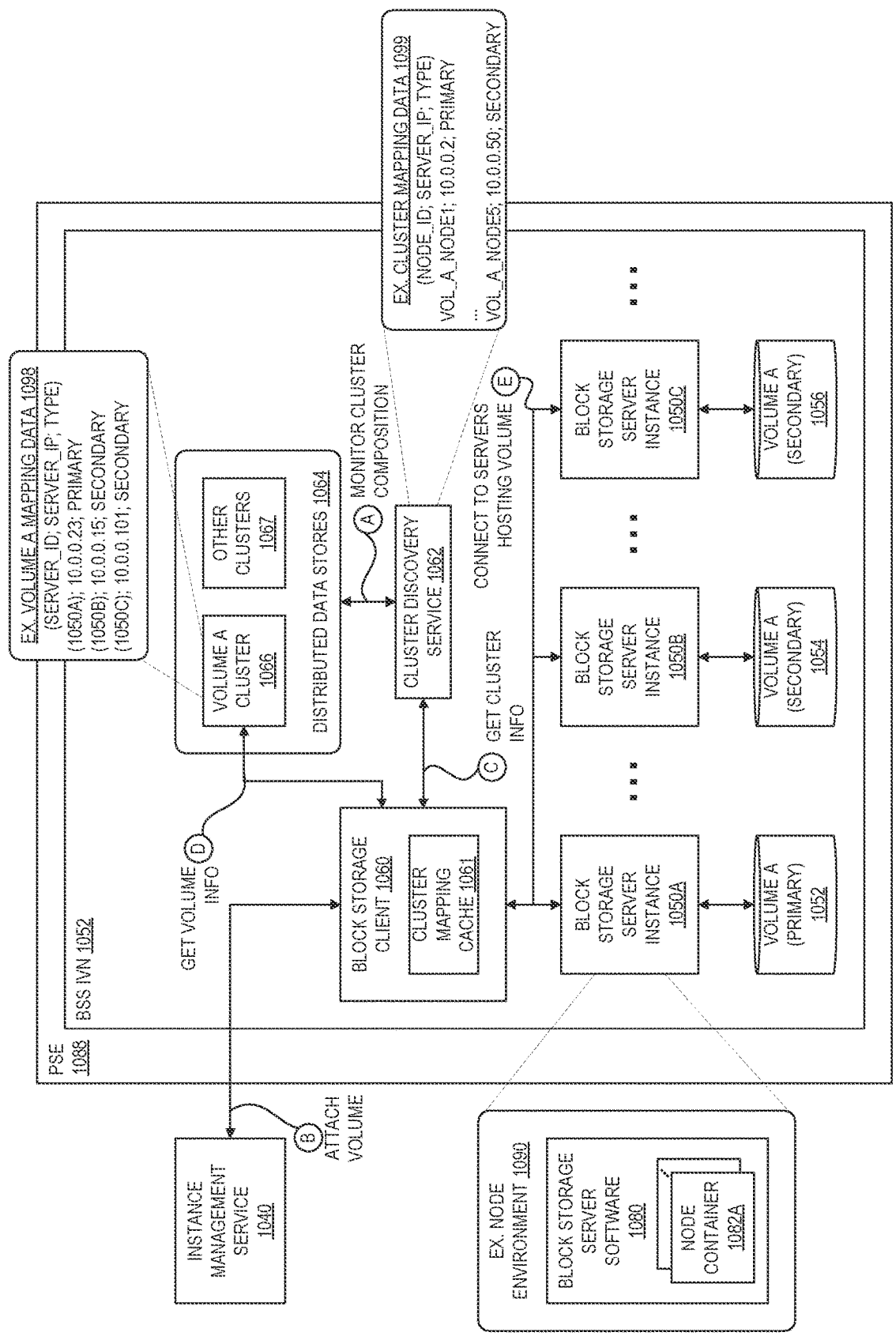
FIG. 10 is a block diagram illustrating an example system for providing volume mappings to block storage clients according to at least some embodiments.

FIG. 10 is a block diagram illustrating an example system for providing volume mappings to block storage clients according to at least some embodiments. As alluded to above, a single volume may be associated with multiple replicas such as a primary replica and some number of secondary replicas. Each replica may be distributed across some number of block storage servers. The association between a volume, its replicas, and the servers hosting those replicas (or pieces of replicas) can change over time as hardware failures occur or as data is migrated between servers as part of background load balancing operations. In deploying block storage servers to a PSE, those associations are preferably allowed to change even when the PSE is disconnected from or unable to reach a provider network in order to maintain a high degree of data availability (e.g., failing from a primary replica to a secondary replica) durability (e.g., immediately beginning the process of recreating lost data in the event of a server failure).

As illustrated, a PSE 1088 includes components to track how a volume is distributed (or mapped) across block storage server instances so that when a block storage client needs to access a volume, the block storage client can locate the block storage servers hosting that volume. Example volume A mapping data 1098 includes several items for each entry: a server identifier (e.g., a unique identifier associated with the instance or host hardware), a server address (e.g., an IP address), and a volume type (e.g., whether primary or secondary) for a volume A. Mapping data can include different or additional items such as block identifiers (e.g., if the replica is divided or striped across multiple block storage server instances. The example volume A mapping data 1098 indicates that volume A includes a primary replica 1052 provided by the block storage server instance 1050A and two secondary replicas 1054 and 1056 provided by block storage server instances 950B and 1050C, respectively. Note that the PSE 1088 can, and likely does, host many other block storage server instances (not shown).

To reliably store volume mapping data 1098, distributed data stores 1064 can store the volume mapping data 1098. In some embodiments, each distributed data store corresponds to a cluster of nodes that separately maintain the state of volume mapping(s). Each node in the cluster exchanges messages with other nodes of the cluster to update its state based on the state as viewed by other cluster nodes. One of the nodes of the cluster may be designated as a leader or primary node through which changes to the volume mappings are proposed. The nodes of the cluster can implement a consensus protocol such as the Paxos protocol to propose and agree upon changes to the volume mapping data for a given volume. A cluster may track volume mapping data for one or more volumes. As illustrated, a cluster 1066 tracks volume mapping data 1098 for volume A, while other clusters 1067 track volume mapping data for other volumes.

In some embodiments, the nodes of the cluster are instances executed by hosts of the provider network. Such instances persist their individual view of the volume mappings data to the non-volatile storage of the host (e.g., via a block storage client to a volume hosted by a block storage server instance). In other embodiments, the nodes of a cluster are part of the block storage server software executed by block storage server instances. As illustrated in example node software environment 1090, a node can execute as a container 1082 hosted within a container engine process included in the block storage server software 1080. Such a node can persist its view of the volume mapping data directly to a volume provided by the block storage server software. Preferably, nodes of the cluster are hosted by separate instances or within separate failure domains.

Like other software executed by hosts of a PSE, the nodes are subject to hardware faults. In such an event, the remaining nodes (or a block storage service of the provider network) can detect the loss of a node, create a new node to replace the lost node, and update the volume mapping data of the new node based on the consensus view of the volume mapping data of other nodes. As a result, not only can the volume mapping data change, the identities of the instances hosting nodes of a cluster can change. The cluster can be tracked using cluster mapping data. Example cluster mapping data 1099 includes several items: a node identifier (e.g., VOL_A_NODE1), a node address (e.g., an IP address), and a node type (e.g., whether the leader node). In this example, a cluster is formed of five nodes.

The cluster mapping data can be determined and maintained by a cluster discovery service 1062. As indicated at circle A, the cluster discovery service 1062 can monitor the node locations of clusters for the various volumes hosted by block storage server instances within the PSE. The cluster discovery service 1062 can monitor node locations in various ways. For example, in embodiments where nodes are executed in the environment 1090, the cluster discovery service 1062 can periodically poll all of the block storage server instances 1050 hosted by the PSE 1088 to obtain the identity of any resident nodes. As another example, the network managers of hosts of the PSE 1088 may be configured to route a special broadcast message to any hosted cluster node (e.g., hosted directly or indirectly such as by a block storage server instance). The cluster discovery service 1062 can periodically broadcast a query to obtain the identity of any hosted cluster nodes.

In some embodiments, the cluster discovery service 1062 is an instance hosted by one of the hosts of the PSE 1088. Such an instance can have a VNA with a reserved IP address within the BSS IVN 1052 so that it can be reached even in the event it has to change hosts due to a hardware failure. In other embodiments, the cluster discovery service 1062 can be integrated into a DNS service of the PSE. For example, volume clusters can be associated with a domain, and the DNS service can resolve name resolution requests to that name to an IP address of one or more nodes of the cluster.

As indicated at circle B, an instance management service 1040 can send a message to a block storage client 1060 of a particular host to attach a volume to a hosted instance (not shown). For example, the instance management service 1040 can send a message to the host that includes an instance identifier and a volume identifier of volume A. As indicated at circle C, the block storage client 1060 can query the cluster discovery service 1062 to obtain an identity of one or more nodes of the volume A cluster 1066 In some embodiments, the block storage client 1060 can cache cluster mapping data in a cluster mapping data cache 1066. Note that in some embodiments, the cluster discovery service 1062 may be omitted and the block storage client 1060 configure to query (e.g., via the broadcast mechanism described above) block storage server instances of the PSE 1088 to identify nodes of the volume A cluster 1066.

As indicated at circle D, the block storage client 1060 can obtain the current view of the volume mapping data for volume A from the cluster 1066 and, based on the volume mapping data, connect to the block storage servers 1050 hosting volume A, as indicated at circle E. Though not illustrated, in some embodiments, upon receiving a connection request from a client, the block storage server can send a message to the volume cluster to indicate whether the block storage server is still hosting that volume (or at least a portion of the volume). Despite receiving a connection request from a block storage client, the block storage server may not host the volume for a variety of reasons. For example, a recent change to the set of servers hosting a volume may have yet to propagate to or through the volume cluster or a block storage client sending a connection request may have relied on out-of-date cached volume mapping data. Regardless of whether the block storage server is hosting the volume, the block storage server receiving the connection request from a client can obtain the identity of one or more nodes of the volume from the cluster discovery service 1062. If the block storage server is no longer hosting the volume, the block storage server can propose an update to the data store maintained by the cluster to remove the block storage server from the volume mapping data. Additionally, the block storage server may send a response to the block storage client that initiated the request to indicate that the connection attempt failed, optionally indicating that the volume is no longer hosted by the server. If the block storage server is still hosting the volume, the block storage server can send an acknowledgement to the cluster to indicate to the cluster that at least that portion of the mapping data remains valid.

Figure 11:
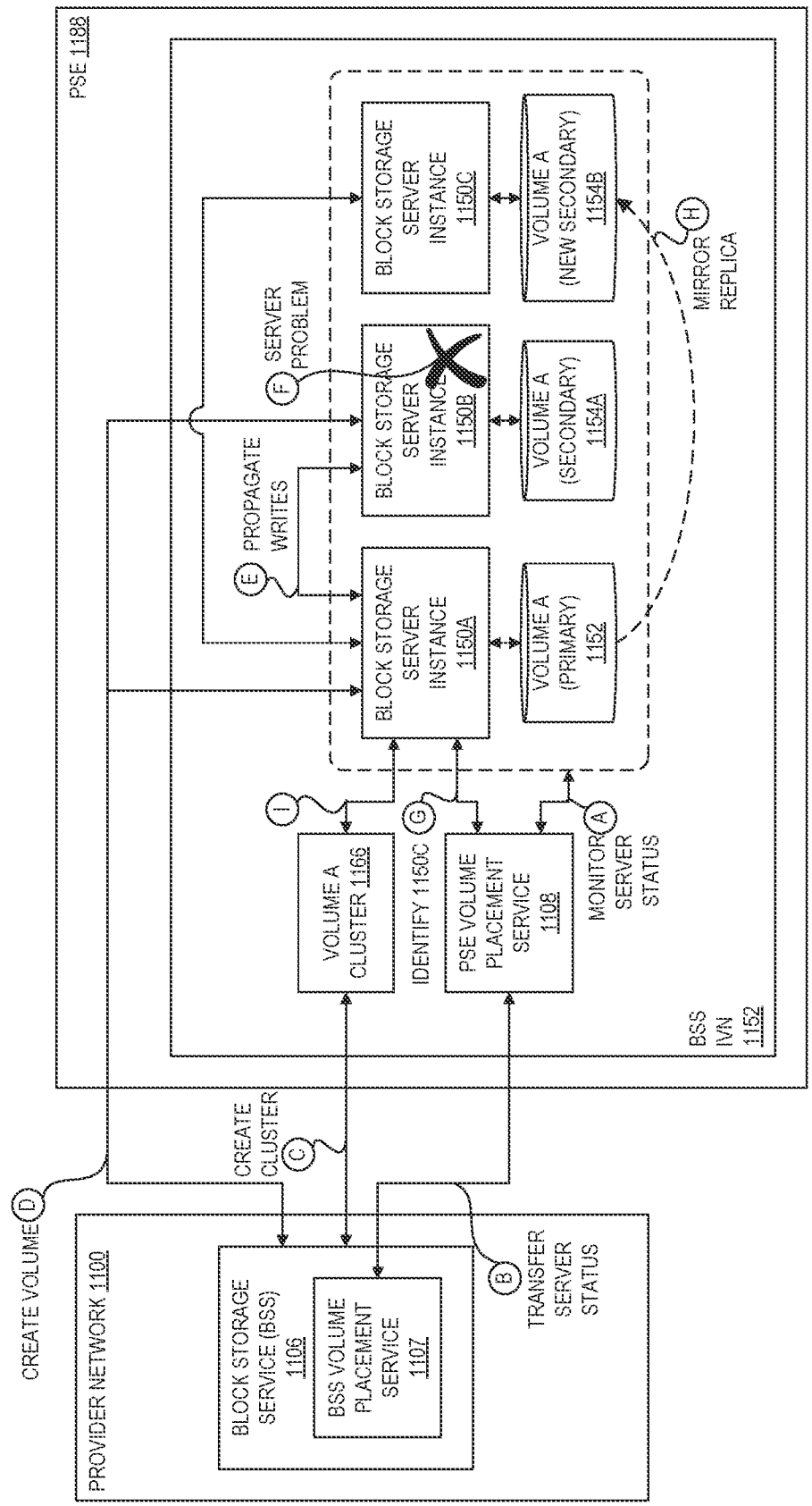
FIG. 11 is a block diagram illustrating an example system for tracking volume mappings according to at least some embodiments.

FIG. 11 is a block diagram illustrating an example system for tracking volume mappings according to at least some embodiments. As described above, the connectivity between a PSE and a provider network cannot be guaranteed. To meet desired levels of data availability and data durability, a PSE includes facilities to allow the mappings between a given volume and the block storage server instances hosting that volume to change. As described with reference to FIG. 10, a volume for a given volume can be tracked using a cluster implementing a distributed data store. FIG. 11 illustrates a tiered approach to volume placement—or the process by which block storage server instances are selected to host replicas or portions of replicas for a volume. In particular, a BSS volume placement service 1107 of a BSS 1106 makes the initial placement determinations and associated volume mapping upon creation of a volume, and a PSE volume placement service 1108 manages subsequent changes to the volume mapping over the lifetime of the volume. The PSE volume placement service 1108 can be implemented in various ways, such as by an instance hosted by the PSE 1188, integrated as a component of a PSE framework (e.g., the PSE framework 202), etc.

As indicated at circle A, the PSE volume placement service 1108 monitors the status of the block storage server instances hosted by a PSE 1188. For example, the PSE volume placement service 1108 can periodically poll the hosted block storage server instances to check whether they are responsive and/or to collect metrics related to the resource usage of the hosted block storage server instances, their failure domains, and/or the hosts (e.g., such as described with reference to FIG. 9). As illustrated, the PSE volume placement service 1108 can send the collected server status to the BSS volume placement service 1107 as indicated at circle B. Note that in other embodiments, the BSS volume placement service 1107 may obtain metrics related to resource utilization from an instance management service (such as described with reference to FIG. 9).

Upon receiving a request to create a new block storage volume for an instance hosted by the PSE 1188, the BSS 1106 can request volume placement recommendations from the BSS placement service 1107. Depending on the profile of the new volume (e.g., how many replicas, whether replicas as striped, etc.), the BSS placement service 1107 can provide identifications of the recommended block storage server instances. In this example, the BSS placement service 1107 recommends block storage server instances 1150A and 1150B to host a new volume A with two replicas. Adopting the recommended block storage server instances, the BSS 1106 creates a new cluster 1166 to track the volume mapping data for volume A as indicated at circle C. The mapping data initially identifies the block storage server instance 1150A as hosting the primary replica and the block storage server instances 1150B as hosting the secondary replica. Additionally, the BSS 1106 sends one or more messages to the identified block storage servers to create storage volumes (e.g., a storage volume hosted by a block storage server instance 1150A and storage volume hosted by a block storage server instance 1150B) as indicated at circle D. The storage volumes can be backed by the underlying host storage device capacity provisioned to the respective block storage server instances. The storage volume created with block storage server instance 1150A can host a primary replica 1152 of volume A, and the storage volume created with block storage server instance 1150B can host a secondary replica 1154A of volume A. In some embodiments, the block storage server instances can load the newly created storage volumes from a volume snapshot or machine image such as described with reference to FIG. 8. In this example, an instance (not shown) attached to volume A carries out block storage operations for some time, with the block storage server instance 1150A communicating with the block storage server instance 1150B (e.g., to propagate writes to the primary replica 1152 to the secondary replica 1154B as indicated at circle E).

At some point, the block storage server instance 1150B may experience a problem, as indicated at circle F. For example, the block storage server instance 1150B may become slow or unresponsive (e.g., due to a memory leak, hardware failure, etc.). Detection of the problem can happen in various ways. In some embodiments, the block storage server instance 1150A detects the problem, such as due to a failure to acknowledge propagated writes. In such a case, the block storage server instance 1150A may include a policy that includes one or more actions to carry out in response to a detected problem. For example, the block storage server instance 1150A may wait for some number of consecutive propagated writes to go unacknowledged or wait some period of time. At that point, the block storage server instance 1150A can request a replacement block storage server instance for the secondary replica 1154 from the PSE volume placement service 1108. In other embodiments, the PSE volume placement service 1108 detects the problem (e.g., based on collected metrics or responsiveness) during the monitoring described above with reference to circle A. Again, the PSE volume placement service 1108 may include a policy that includes one or more actions to carry out in response to a detected problem, including initiating the replacement of a block storage server instance for the secondary replica 1154. Regardless of the detector, the PSE volume placement service 1108 provides the block storage server instance 1150A with the identity of a replacement block storage server instance.

In this example, the PSE volume placement service 1108 identifies a block storage server instance 1150C to the block storage server instance 1150A as indicated at circle G. A message is sent to the block storage server instance 1150C to create a storage volume to back the replica data being relocated. For example, upon identifying the block storage server instance 1150C, the PSE volume placement service 1108 can send a message to the block storage server instance 1150C to create a storage volume. As another example, the block storage server instance 1150A can send a message to create a storage volume upon receiving the identification from the PSE volume placement service 1108. Once created, the block storage server instance 1150A can initiate the mirroring of the replica 1152 to the block storage server instance 1150C as the replica 1154B as indicated at circle H. Note that if the block storage server instance 1150B remains responsive (e.g., but is exhibiting poor performance), the mirroring operation can be carried out by copying the replica 1154A to the replica 1154B. While remirroring from either the replica 1154 or the replica 1152 is feasible in this scenario because those replicas are not distributed amongst storage severs, in other embodiments various storage servers across which a replica is distributed may need to be accessed to recreate or otherwise generate the lost data such as by using the redundancy (e.g., parity bits, error correcting codes, etc.) encoded into the stored data. For example, if a replica data is encoded and distributed across ten block storage server instances, one of which was lost, the lost data can be recreated by reading the data associated with the replica from the nine remaining block storage server instances. As another example, if another ten block storage servers host another replica of the volume using a same distribution pattern, the lost data can be copied from the block storage server instance hosting the corresponding portion of the other replica.

As indicated at circle I, the block storage server instance 1150A can submit a request to update the volume mapping for volume A to the cluster 1166, replacing the block storage server instance 1150B with the block storage server instance 1150C as the host of the secondary replica. The block storage server instance 1150A may submit the request to the cluster 1166 upon initiating or completing the remirroring to the block storage server instance 1150C. In other embodiments, another entity may submit the request to update the volume mapping for volume A to the cluster 1166, such as the PSE volume placement service 1108 or the block storage server instance 1150C.

Figure 12:
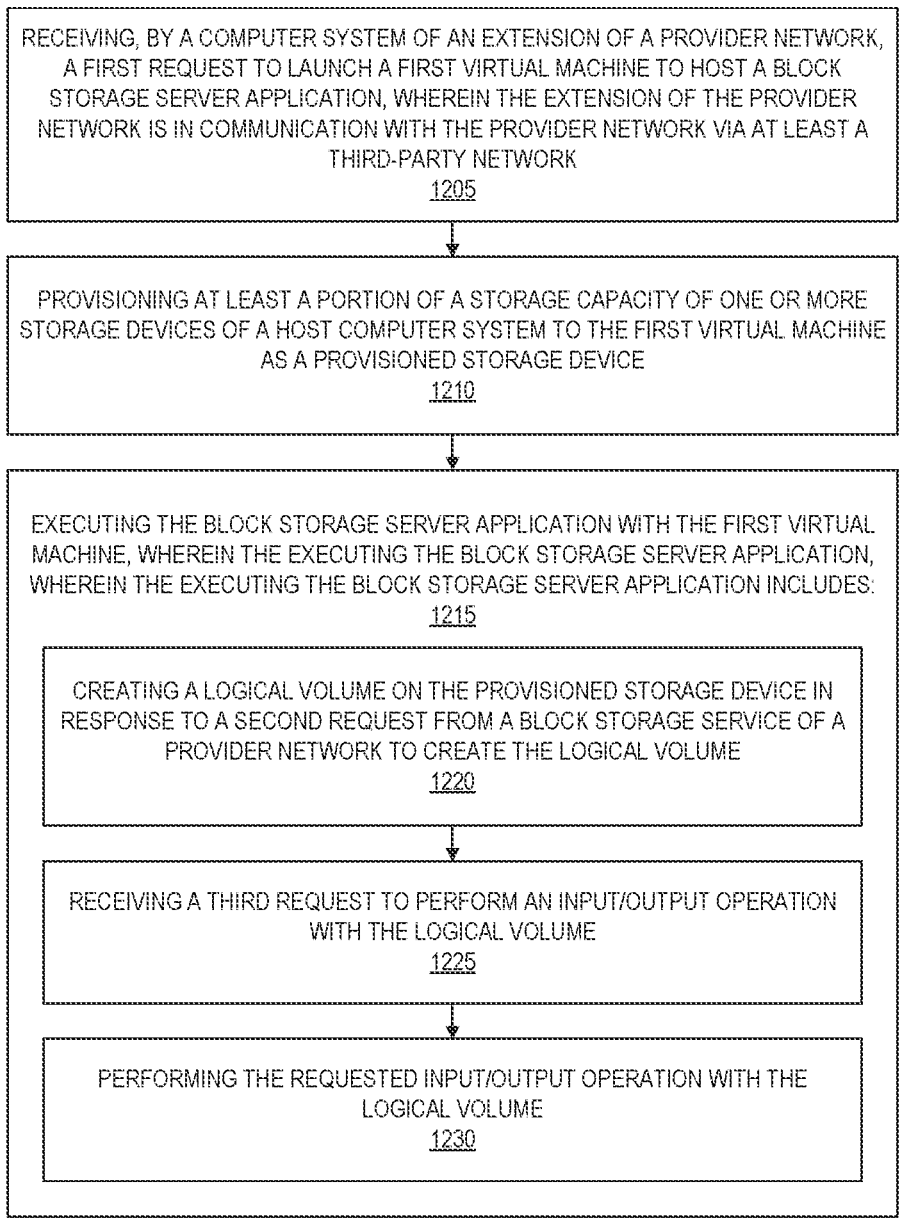
FIG. 12 is a flow diagram illustrating operations of a method for launching a virtualized block storage server according to at least some embodiments.

FIG. 12 is a flow diagram illustrating operations of a method for launching a virtualized block storage server according to at least some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are carried out by computer programs or applications executed by one or more components of an extension of the provider network. The extension of the provider network includes one or more physical computing devices or systems and is remotely located from a data center (e.g., outside of the data center network) of the provider network, such as on the premises of a customer of the provider network. The provider network, such as a cloud provider network, includes various services executed by computer systems located within a data center of the provider network. The one or more components of the extension communicate the provider network, such as by receiving management operations from the services executed by computer systems of the provider network. In some embodiments, one or more (or all) of the operations are performed by components of a host (e.g., the host 420A) of the other figures.

The operations include, at block 1205, receiving, by a computer system of an extension of a provider network, a first request to launch a first virtual machine to host a block storage server application, wherein the extension of the provider network is in communication with the provider network via at least a third-party network. In providing block storage devices to instances hosted by a PSE, the virtualization provided by hosts of a PSE can be used to host a block storage server. For example, a block storage service of the provider network can initiate the launch of a block storage server virtual machine via by an instance management service, which in turn can issue the launch request to a host manager of a selected host of the PSE via a secure communications channel between the provider network and the PSE.

The operations further include, at block 1210, provisioning at least a portion of a storage capacity of one or more storage devices of a host computer system to the first virtual machine as a provisioned storage device. As part of launching a virtual machine, a host manager of the host system can allocate or otherwise provision some portion of the computing resources of the host system to the virtual machine. Such resources can include, for example, storage capacity of the storage devices of the host system (e.g., SSDs), memory capacity (e.g., RAM), processor or processor cores, etc.

The operations further include, at block 1215, executing the block storage server application with the first virtual machine. As part of executing the block storage server application, the operations further include, at block 1220, creating a logical volume on the provisioned storage device in response to a second request from a block storage service of a provider network to create the logical volume. For example, the block storage service of the provider network can send one or more messages to create a volume (using the provisioned storage capacity) that can be attached to other instances such that an instance can access the volume via a block storage interface.

As part of executing the block storage server application, the operations further include, at block 1225, receiving a third request to perform an input/output operation with the logical volume and, at block 1230, performing the requested input/output operation with the logical volume. For example and with reference to FIG. 4, the instance A 430 can issue a command to read a block of data from a block address of the virtual block device attached to the instance and backed by the block storage volume A 434. The block storage server instance 450 can receive that command (e.g., via the BSS IVN 452) and process it against the block storage volume A 434. As another example and with reference to FIG. 5, the instance B 436 can issue a command to write a block of data to a block address of the virtual block device attached to the instance and backed by the block storage volume B 440. The block storage server instance 450 can receive that command (e.g., via the BSS IVN 452) and process it against the block storage volume A 440.

Figure 13:
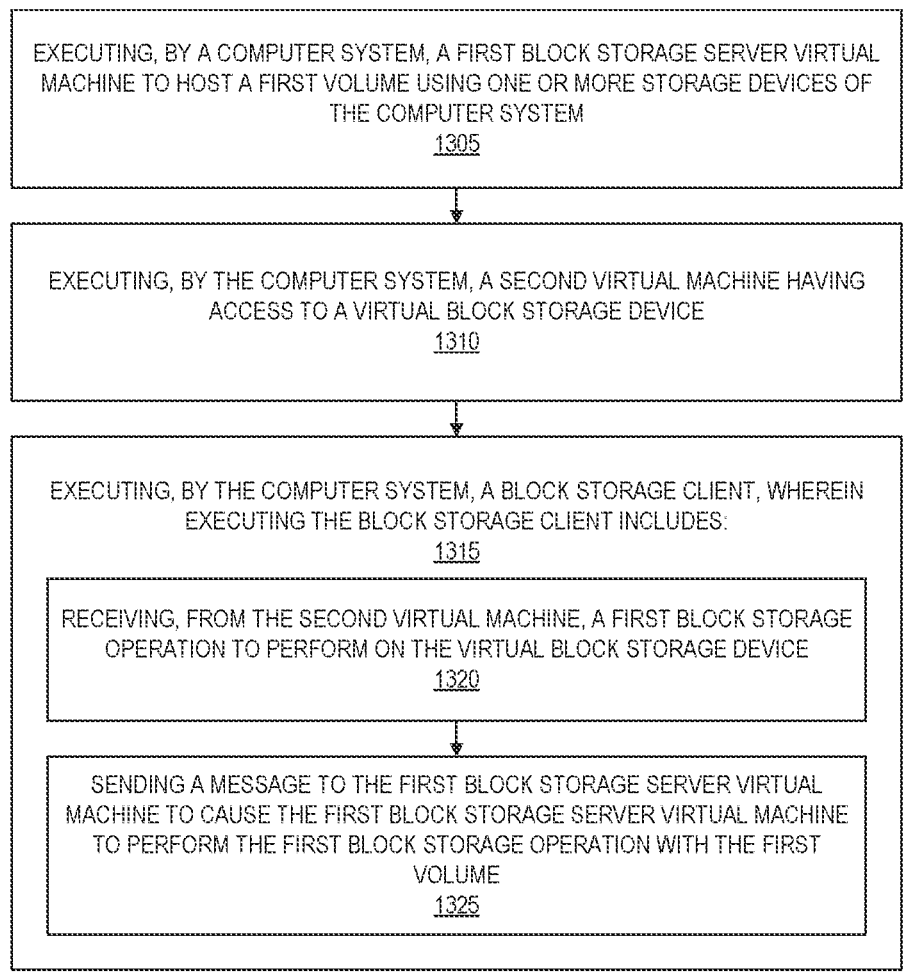
FIG. 13 is a flow diagram illustrating operations of a method for using a virtualized block storage server according to at least some embodiments.

FIG. 13 is a flow diagram illustrating operations of a method for using a virtualized block storage server according to at least some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are carried out by computer programs or applications executed by one or more components of an extension of the provider network. The extension of the provider network includes one or more physical computing devices or systems and is remotely located from a data center (e.g., outside of the data center network) of the provider network, such as on the premises of a customer of the provider network. The provider network, such as a cloud provider network, includes various services executed by computer systems located within a data center of the provider network. The one or more components of the extension communicate the provider network, such as by receiving management operations from the services executed by computer systems of the provider network. In some embodiments, one or more (or all) of the operations are performed by a host (e.g., the host 420A) of the other figures.

The operations include, at block 1305, executing, by a computer system, a first block storage server virtual machine to host a first volume using one or more storage devices of the computer system. As illustrated in FIG. 4, for example, the host 420A is hosting a virtual machine—the block storage server instance 450. The operations further include, at block 1310, executing, by the computer system, a second virtual machine having access to a virtual block storage device. The host 420A is also hosting another virtual machine—the instance 430. The operations further include, at block 1315, executing, by the computer system, a block storage client. The host 420A includes a block storage client 460A, which can facilitate the attachment of block storage devices to hosted virtual machines. As part of executing the block storage client, the operations further include, at block 1320, receiving, from the second virtual machine, a first block storage operation to perform on the virtual block storage device and, at block 1325, sending a message to the first block storage server virtual machine to cause the first block storage server virtual machine to perform the first block storage operation with the first volume. Virtual machines can issue block storage operations to block storage devices attached via the block storage client (e.g., a block reads, writes, burst reads, writes, etc.). The block storage client can relay those block storage operations to the block storage server hosting the volume that contains the block address across a network, for example.

Figure 14:
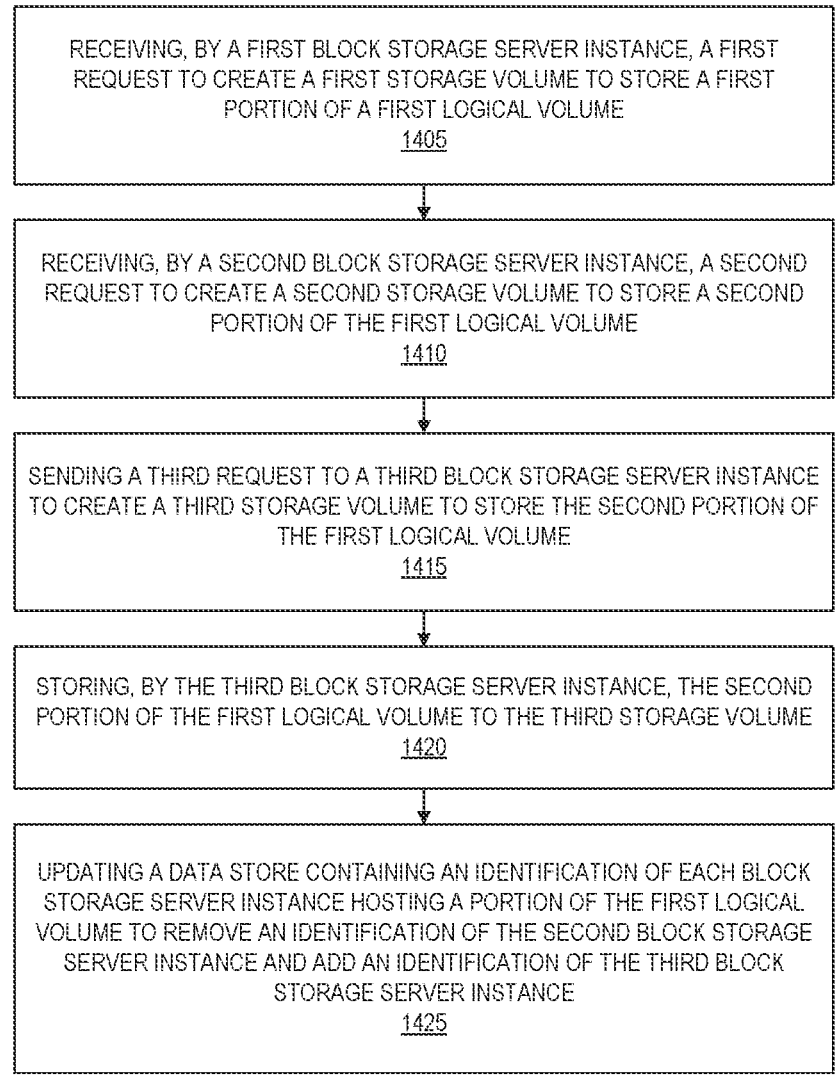
FIG. 14 is a flow diagram illustrating operations of a method for managing virtualized block storage servers in a provider substrate extension according to at least some embodiments.

FIG. 14 is a flow diagram illustrating operations of a method for managing virtualized block storage servers in a provider substrate extension according to at least some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are carried out by computer programs or applications executed by one or more components of an extension of the provider network. The extension of the provider network includes one or more physical computing devices or systems and is remotely located from a data center (e.g., outside of the data center network) of the provider network, such as on the premises of a customer of the provider network. The provider network, such as a cloud provider network, includes various services executed by computer systems located within a data center of the provider network. The one or more components of the extension communicate the provider network, such as by receiving management operations from the services executed by computer systems of the provider network. In some embodiments, one or more (or all) of the operations are performed by components of a PSE (e.g., the PSE 1088, the PSE 1188) of the other figures.

The operations include, at block 1405, receiving, by a first block storage server instance, a first request to create a first storage volume to store a first portion of a first logical volume and, at block 1410, receiving, by a second block storage server instance, a second request to create a second storage volume to store a second portion of the first logical volume. As illustrated in FIG. 11, for example, the initial placement of a volume (e.g., replicas, striped replicas, etc.) can originate from a block storage service 1106 of a provider network and be received by components of the PSE 1188. In the example illustrated in FIG. 11, a volume A is initially stored using block storage server instances 1150A and 1150C on hosts of the PSE 1188.

The operations further include, at block 1415, sending a third request to a third block storage server instance to create a third storage volume to store the second portion of the first logical volume. At some point, a block storage server instance hosting a portion of a volume may need to change. As described herein, the PSE volume placement service 1108 or one of the other block storage server instances hosting the volume can send a message to another block storage server instance to replace the instance being changed.

The operations further include, at block 1420, storing, by the third block storage server instance, the second portion of the first logical volume to the third storage volume. The operations further include, at block 1425, updating a data store containing an identification of each block storage server instance hosting a portion of the first logical volume to remove an identification of the second block storage server instance and add an identification of the third block storage server instance. To track the migration of the volume across instances, the PSE 1188 can host a data store that maps the volume (including its replicas, striping across servers, if any, etc.). Such a data store may be a cluster such as described with reference to FIG. 10.

Figure 15:
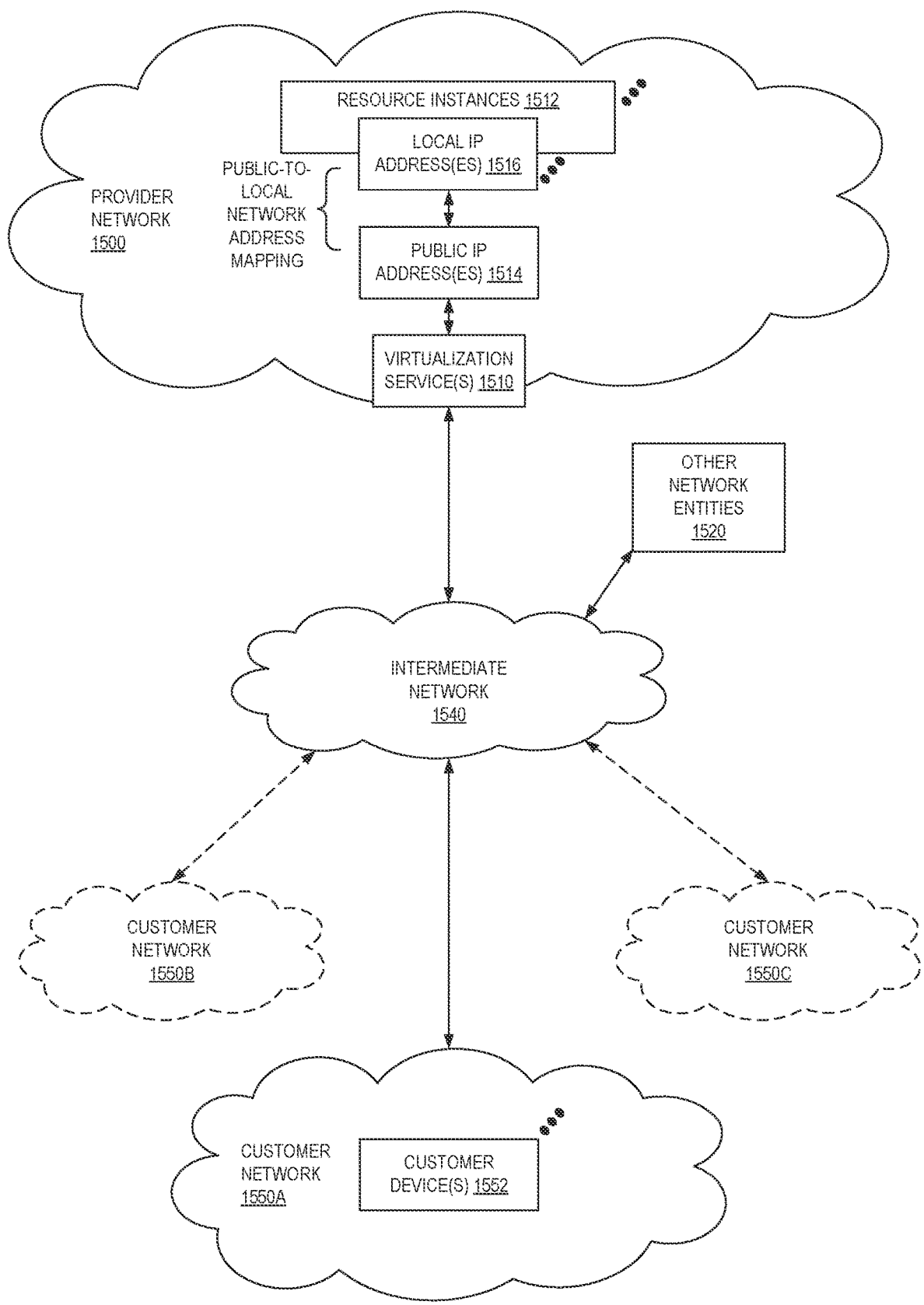
FIG. 15 illustrates an example provider network environment according to at least some embodiments.

FIG. 15 illustrates an example provider network (or "service provider system") environment according to at least some embodiments. A provider network 1500 may provide resource virtualization to customers via one or more virtualization services 1510 that allow customers to purchase, rent, or otherwise obtain instances 1512 of virtualized resources, including but not limited to computation and storage resources, implemented on devices within the provider network or networks in one or more data centers. Local Internet Protocol (IP) addresses 1516 may be associated with the resource instances 1512; the local IP addresses are the internal network addresses of the resource instances 1512 on the provider network 1500. In some embodiments, the provider network 1500 may also provide public IP addresses 1514 and/or public IP address ranges (e.g., Internet Protocol version 4 (IPv4) or Internet Protocol version 6 (IPv6) addresses) that customers may obtain from the provider 1500.

Conventionally, the provider network 1500, via the virtualization services 1510, may allow a customer of the service provider (e.g., a customer that operates one or more client networks 1550A-1550C including one or more customer device(s) 1552) to dynamically associate at least some public IP addresses 1514 assigned or allocated to the customer with particular resource instances 1512 assigned to the customer. The provider network 1500 may also allow the customer to remap a public IP address 1514, previously mapped to one virtualized computing resource instance 1512 allocated to the customer, to another virtualized computing resource instance 1512 that is also allocated to the customer. Using the virtualized computing resource instances 1512 and public IP addresses 1514 provided by the service provider, a customer of the service provider such as the operator of customer network(s) 1550A-1550C may, for example, implement customer-specific applications and present the customer's applications on an intermediate network 1540, such as the Internet. Other network entities 1520 on the intermediate network 1540 may then generate traffic to a destination public IP address 1514 published by the customer network(s) 1550A-1550C; the traffic is routed to the service provider data center, and at the data center is routed, via a network substrate, to the local IP address 1516 of the virtualized computing resource instance 1512 currently mapped to the destination public IP address 1514. Similarly, response traffic from the virtualized computing resource instance 1512 may be routed via the network substrate back onto the intermediate network 1540 to the source entity 1520.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1500; a customer may then assign their allocated public IP addresses to particular resource instances allocated to the customer. These public IP addresses may be referred to as customer public IP addresses, or simply customer IP addresses. Instead of being assigned by the provider network 1500 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 16:
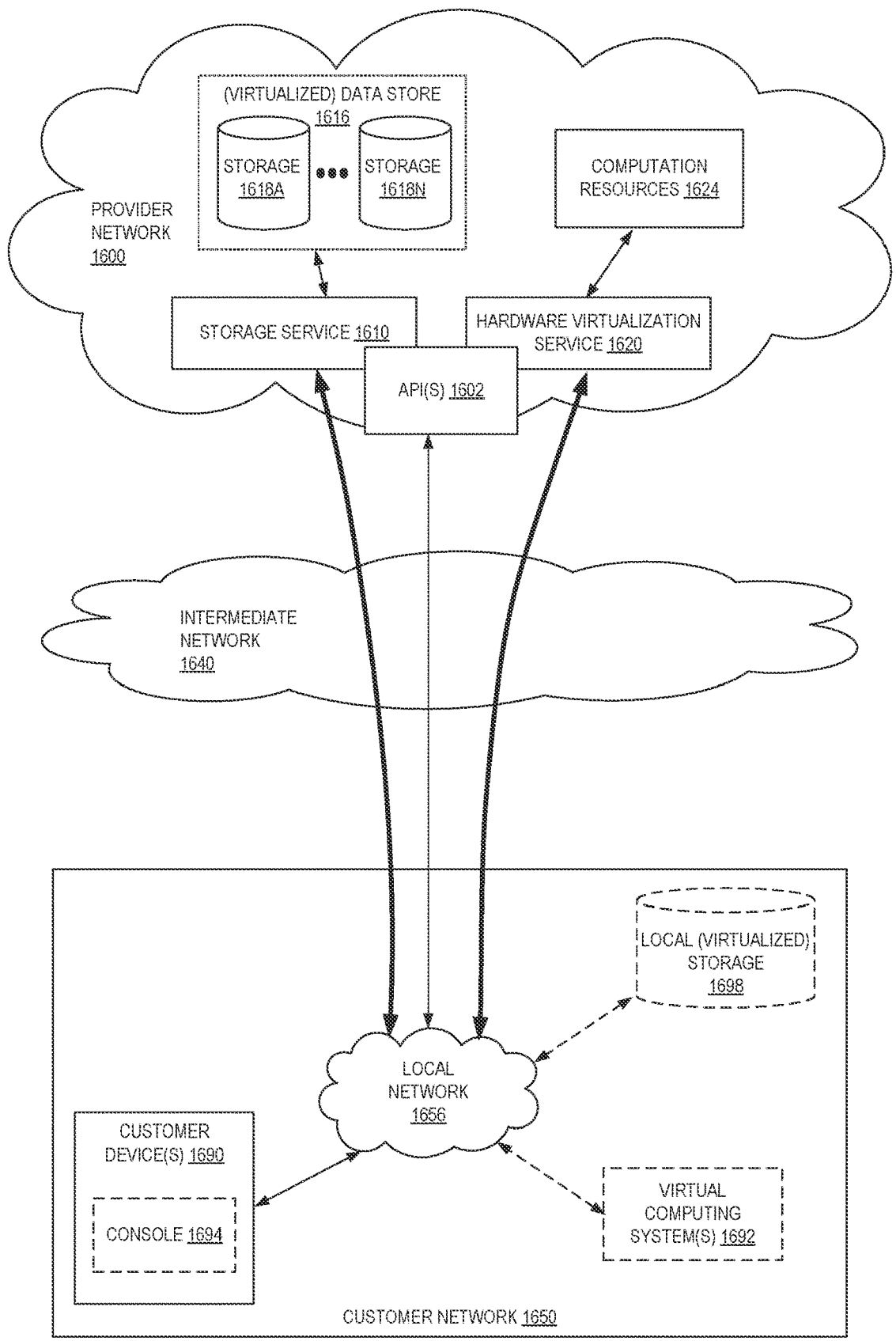
FIG. 16 is a block diagram of an example provider network that provides a storage service and a hardware virtualization service to customers according to at least some embodiments.

FIG. 16 is a block diagram of an example provider network that provides a storage service and a hardware virtualization service to customers according to at least some embodiments. Hardware virtualization service 1620 provides multiple computation resources 1624 (e.g., VMs) to customers. The computation resources 1624 may, for example, be rented or leased to customers of the provider network 1600 (e.g., to a customer that implements customer network 1650). Each computation resource 1624 may be provided with one or more local IP addresses. Provider network 1600 may be configured to route packets from the local IP addresses of the computation resources 1624 to public Internet destinations, and from public Internet sources to the local IP addresses of computation resources 1624.

Provider network 1600 may provide a customer network 1650, for example coupled to intermediate network 1640 via local network 1656, the ability to implement virtual computing systems 1692 via hardware virtualization service 1620 coupled to intermediate network 1640 and to provider network 1600. In some embodiments, hardware virtualization service 1620 may provide one or more APIs 1602, for example a web services interface, via which a customer network 1650 may access functionality provided by the hardware virtualization service 1620, for example via a console 1694 (e.g., a web-based application, standalone application, mobile application, etc.). In some embodiments, at the provider network 1600, each virtual computing system 1692 at customer network 1650 may correspond to a computation resource 1624 that is leased, rented, or otherwise provided to customer network 1650.

From an instance of a virtual computing system 1692 and/or another customer device 1690 (e.g., via console 1694), the customer may access the functionality of storage service 1610, for example via one or more APIs 1602, to access data from and store data to storage resources 1618A-1618N of a virtual data store 1616 (e.g., a folder or "bucket", a virtualized volume, a database, etc.) provided by the provider network 1600. In some embodiments, a virtualized data store gateway (not shown) may be provided at the customer network 1650 that may locally cache at least some data, for example frequently-accessed or critical data, and that may communicate with storage service 1610 via one or more communications channels to upload new or modified data from a local cache so that the primary store of data (virtualized data store 1616) is maintained. In some embodiments, a user, via a virtual computing system 1692 and/or on another customer device 1690, may mount and access virtual data store 1616 volumes via storage service 1610 acting as a storage virtualization service, and these volumes may appear to the user as local (virtualized) storage 1698.

While not shown in FIG. 16, the virtualization service(s) may also be accessed from resource instances within the provider network 1600 via API(s) 1602. For example, a customer, appliance service provider, or other entity may access a virtualization service from within a respective virtual network on the provider network 1600 via an API 1602 to request allocation of one or more resource instances within the virtual network or within another virtual network.

Figure 17:
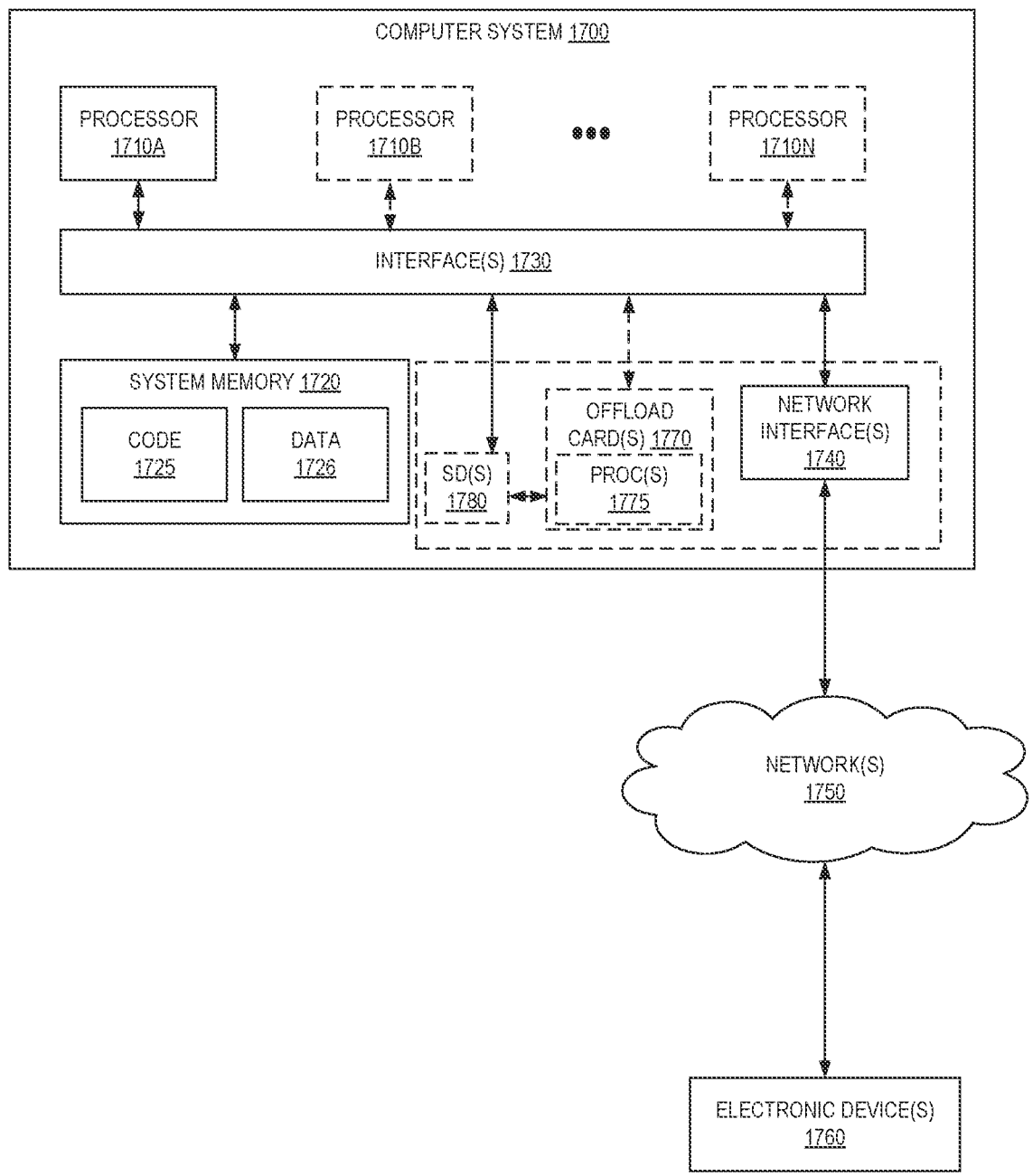
FIG. 17 is a block diagram illustrating an example computer system that may be used in at least some embodiments.

FIG. 17 is a block diagram illustrating an example computer system that may be used in at least some embodiments. In at least some embodiments, such a computer system can be used as a server that implements one or more of the control-plane and/or data-plane components that are used to support the provider substrate and/or PSE described herein, various virtualized components (e.g., virtual machines, containers, etc.), and/or SED. Such a computer system can include a general- or special-purpose computer system that includes or is configured to access one or more computer-accessible media. In at least some embodiments, such a computer system can also be used to implement components outside of the provider substrate and/or provider substrate extension (e.g., the customer gateway/router 186, other customer resources 187, and the like). In the illustrated embodiment of a computer system, the computer system computer system 1700 includes one or more processors 1710 coupled to a system memory 1720 via an input/output (I/O) interface 1730. Computer system 1700 further includes a network interface 1740 coupled to I/O interface 1730. While FIG. 17 shows computer system 1700 as a single computing device, in various embodiments a computer system 1700 may include one computing device or any number of computing devices configured to work together as a single computer system 1700.

In various embodiments, computer system 1700 may be a uniprocessor system including one processor 1710, or a multiprocessor system including several processors 1710 (e.g., two, four, eight, or another suitable number). Processors 1710 may be any suitable processors capable of executing instructions. For example, in various embodiments, processors 1710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1710 may commonly, but not necessarily, implement the same ISA.

System memory 1720 may store instructions and data accessible by processor(s) 1710. In various embodiments, system memory 1720 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1720 as code 1725 and data 1726.

In one embodiment, I/O interface 1730 may be configured to coordinate I/O traffic between processor 1710, system memory 1720, and any peripheral devices in the device, including network interface 1740 or other peripheral interfaces. In some embodiments, I/O interface 1730 may perform any necessary protocol, timing, or other data transformations to convert data signals from one component (e.g., system memory 1720) into a format suitable for use by another component (e.g., processor 1710). In some embodiments, I/O interface 1730 may include support for devices attached through various types of peripheral buses, such as a variant of the Peripheral Component Interconnect (PCI) bus standard or the Universal Serial Bus (USB) standard, for example. In some embodiments, the function of I/O interface 1730 may be split into two or more separate components, such as a north bridge and a south bridge, for example. Also, in some embodiments some or all of the functionality of I/O interface 1730, such as an interface to system memory 1720, may be incorporated directly into processor 1710.

Network interface 1740 may be configured to allow data to be exchanged between computer system 1700 and other devices 1760 attached to a network or networks 1750, such as other computer systems or devices as illustrated in FIG. 1, for example. In various embodiments, network interface 1740 may support communication via any suitable wired or wireless general data networks, such as types of Ethernet network, for example. Additionally, network interface 1740 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1700 includes one or more offload cards 1770 (including one or more processors 1775, and possibly including the one or more network interfaces 1740) that are connected using an I/O interface 1730 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1700 may act as a host electronic device (e.g., operating as part of a hardware virtualization service) that hosts compute instances, and the one or more offload cards 1770 execute a virtualization manager that can manage compute instances that execute on the host electronic device. As an example, in some embodiments the offload card(s) 1770 can perform compute instance management operations such as pausing and/or un-pausing compute instances, launching and/or terminating compute instances, performing memory transfer/copying operations, etc. These management operations may, in some embodiments, be performed by the offload card(s) 1770 in coordination with a hypervisor (e.g., upon a request from a hypervisor) that is executed by the other processors 1710A-1710N of the computer system 1700. However, in some embodiments the virtualization manager implemented by the offload card(s) 1770 can accommodate requests from other entities (e.g., from compute instances themselves), and may not coordinate with (or service) any separate hypervisor. With reference to FIG. 2, in at least some embodiments the PSE framework 202 and at least a portion of the functionality of the host manager 222 execute on the one or more processors 1775 of the offload cards 1770 while the instances (e.g., 232, 234, 236) execute on the one or more processors 1710.

In some embodiments, a computer system 1700 includes one or more storage devices (SD) 1780. Example storage devices 1780 include solid-state drives (e.g., with various types of Flash or other memory) and magnetic drives. The processor(s) 1710 may access the SDs 1780 via the interface(s) 1730 or, in some cases, via the offload card(s) 1770. For example, the offload card(s) 1770 may include a system-on-a-chip (SoC) that includes multiple interconnect interfaces, bridging between the interfaces 1730 to an interface to the SDs 1780 (e.g., a PCIe-to-PCIe bridge).

In some embodiments, system memory 1720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1700 via I/O interface 1730. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1700 as system memory 1720 or another type of memory. Further, a computer-accessible medium may include transmission media or signals such as electrical, electromagnetic, or digital signals, conveyed via a communication medium such as a network and/or a wireless link, such as may be implemented via network interface 1740.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle(R), Microsoft(R), Sybase(R), IBM(R), etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 101A, 102A, etc.) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   providing a provider substrate extension comprising one or more computing devices to be physically located at a deployment location, where the one or more computing devices are in communication with a cloud provider network via at least an intermediate network and are controlled at least partly by a control plane operating in a data center of the cloud provider network, wherein the deployment location is physically separate from the data center of the cloud provider network;
   receiving, at the control plane of the cloud provider network, one or more requests to launch a first virtual machine (VM) instance at the deployment location and a storage volume for use by the first VM instance at the deployment location;
   causing a first portion of the one or more computing devices to be virtualized to instantiate the first VM instance; and
   causing a second portion of the one or more computing devices to be virtualized to instantiate the storage volume, comprising executing a second VM instance to host the storage volume using one or more storage devices, wherein the first VM instance utilizes the storage volume via the second VM instance.

2. The computer-implemented method of claim 1, further comprising:
   executing, by the one or more computing devices, a block storage client, wherein the block storage client comprises a software application adapted to intercept or receive block storage operations issued by the first VM instance to the storage volume.

3. The computer-implemented method of claim 2, further comprising:
   receiving, at the block storage client from the first VM instance, a first block storage operation to perform on the storage volume; and
   sending, by the block storage client, a message to the second VM instance to cause the second VM instance to perform the first block storage operation with the storage volume.

4. The computer-implemented method of claim 3, wherein the first block storage operation comprises a request to read a block of data from the storage volume, and wherein the method further comprises:
   receiving, at the block storage client, the block of data from the second VM instance; and
   transmitting, by the block storage client, the block of data to the first VM instance.

5. The computer-implemented method of claim 2, further comprising:
   updating a mapping data structure used by the block storage client to associate the storage volume with the second VM instance;
   causing the one or more computing devices to execute a third VM instance to host a second storage volume; and
   updating the mapping data structure used by the block storage client to associate the second storage volume with the third VM instance.

6. The computer-implemented method of claim 1, wherein causing the one or more computing devices to execute the second VM instance to host the storage volume using the one or more storage devices comprises:
   transmitting, from the control plane of the cloud provider network, a message to the deployment location to launch the second VM instance; and
   transmitting, from the control plane of the cloud provider network to the second VM instance, a request to create the storage volume using an identifier of a snapshot carried in the request.

7. The computer-implemented method of claim 1, further comprising:

causing the second VM instance to mirror the storage volume to a replica volume hosted by a fourth VM instance, wherein the fourth VM instance is executed by a different computing device than the second VM instance within the deployment location.

8. The computer-implemented method of claim 1, wherein the deployment location comprises one of:
- a private or public data center;
- a co-location facility; or
- a telecommunications facility.

9. A system comprising:
- a first one or more computing devices physically located at a deployment location forming a provider substrate extension, wherein the first one or more computing devices are in communication with a cloud provider network via at least an intermediate network and are controlled at least partly by a control plane operating in a data center of the cloud provider network, wherein the deployment location is physically separate from the data center of the cloud provider network;
- a second one or more computing devices located in the data center of the cloud provider network that implement the control plane, the control plane comprising instructions that when executed by the second one or more computing devices cause the control plane to:
  - receive one or more requests to launch a first virtual machine (VM) instance at the deployment location and a storage volume for use by the first VM instance at the deployment location;
  - cause a first portion of the first one or more computing devices to be virtualized to instantiate the first VM instance; and
  - cause a second portion of the first one or more computing devices to be virtualized to instantiate the storage volume, comprising executing a second VM instance to host the storage volume using one or more storage devices, wherein the first VM instance utilizes the storage volume via the second VM instance.

10. The system of claim 9, wherein the first one or more computing devices execute a block storage client, wherein the block storage client comprises a software application adapted to intercept or receive block storage operations issued by the first VM instance to the storage volume.

11. The system of claim 10 wherein the block storage client is to:
- receive, from the first VM instance, a first block storage operation to perform on the storage volume; and
- send a message to the second VM instance to cause the second VM instance to perform the first block storage operation with the storage volume.

12. The system of claim 11, wherein the first block storage operation comprises a request to read a block of data from the storage volume, and wherein the block storage client is further to:
- receive the block of data from the second VM instance; and
- transmit the block of data to the first VM instance.

13. The system of claim 10, wherein the control plane is further to:
- cause the first one or more computing devices to execute a third VM instance to host a second storage volume, wherein a mapping data structure used by the block storage client that associates the storage volume with the second VM instance is updated to further associate the second storage volume with the third VM instance.

14. The system of claim 9, wherein the control plane, to cause the first one or more computing devices to execute the second VM instance to host the storage volume using the one or more storage devices, is at least to:
- transmit a message to the deployment location to launch the second VM instance; and
- transmit, to the second VM instance, a request to create the storage volume using an identifier of a snapshot carried in the request.

15. The system of claim 9, wherein the second VM instance is to mirror the storage volume to a replica volume hosted by a fourth VM instance, wherein the fourth VM instance is executed by a different computing device than the second VM instance within the deployment location.

16. The system of claim 9, wherein the deployment location comprises one of:
- a private or public data center;
- a co-location facility; or
- a telecommunications facility.

17. A non-transitory computer-readable storage medium storing instructions which, when executed by one or more processors of a first one or more computing devices, cause the first one or more computing devices to perform operations as part of implementing a control plane to operate in a data center of a cloud provider network, the operations comprising:
- receiving one or more requests to launch a first virtual machine (VM) instance at a deployment location implementing a provider substrate extension and a storage volume for use by the first VM instance at the deployment location, wherein the deployment location includes a second one or more computing devices that were provided by an organization that operates the cloud provider network and that are in communication with the cloud provider network via at least an intermediate network and further that are controlled at least partly by the control plane operating in the data center of the cloud provider network, wherein the deployment location is physically separate from the data center of the cloud provider network;
- causing a first portion of the second one or more computing devices to be virtualized to instantiate the first VM instance; and
- causing a second portion of the second one or more computing devices to be virtualized to instantiate the storage volume, comprising executing a second VM instance to host the storage volume using one or more storage devices, wherein the first VM instance utilizes the storage volume via the second VM instance.

18. The non-transitory computer-readable storage medium of claim 17, wherein the second one or more computing devices execute a block storage client, wherein the block storage client comprises a software application adapted to intercept or receive block storage operations issued by the first VM instance to the storage volume.

19. The non-transitory computer-readable storage medium of claim 18, wherein the block storage client is to:
- receive, from the first VM instance, a first block storage operation to perform on the storage volume; and
- send a message to the second VM instance to cause the second VM instance to perform the first block storage operation with the storage volume.

20. The non-transitory computer-readable storage medium of claim 19, wherein the first block storage operation comprises a request to read a block of data from the storage volume, and wherein the block storage client is further to:

receive the block of data from the second VM instance; and
transmit the block of data to the first VM instance.

\* \* \* \* \*